(12) United States Patent
Tomisawa et al.

(10) Patent No.: US 8,264,477 B2
(45) Date of Patent: Sep. 11, 2012

(54) IMAGE DISPLAY APPARATUS

(75) Inventors: Isao Tomisawa, Saitama (JP); Masaru Ishikawa, Saitama (JP); Katsumi Unehara, Saitama (JP)

(73) Assignee: Pioneer Corporation, Tokyo (JP)

( * ) Notice: Subject to any disclaimer, the term of this patent is extended or adjusted under 35 U.S.C. 154(b) by 1255 days.

(21) Appl. No.: 11/997,911

(22) PCT Filed: Aug. 3, 2006

(86) PCT No.: PCT/JP2006/315374
§ 371 (c)(1),
(2), (4) Date: Feb. 5, 2008

(87) PCT Pub. No.: WO2007/018111
PCT Pub. Date: Feb. 15, 2007

(65) Prior Publication Data
US 2010/0164910 A1 Jul. 1, 2010

(30) Foreign Application Priority Data
Aug. 5, 2005 (JP) ................. 2005-228766

(51) Int. Cl.
*G09G 5/00* (2006.01)
(52) U.S. Cl. .......................... 345/204; 345/9
(58) Field of Classification Search .......... 345/204, 345/97, 156; 359/462.463, 472
See application file for complete search history.

(56) References Cited

U.S. PATENT DOCUMENTS

| 4,927,238 | A | * | 5/1990 | Green et al. | 359/466 |
|---|---|---|---|---|---|
| 4,995,719 | A | * | 2/1991 | Shanks | 353/122 |
| 5,886,818 | A | | 3/1999 | Summer et al. | |
| 6,377,229 | B1 | * | 4/2002 | Sullivan | 345/6 |
| 2001/0022562 | A1 | * | 9/2001 | Ishikawa | 345/9 |
| 2005/0122584 | A1 | * | 6/2005 | Ishikawa et al. | 359/463 |

FOREIGN PATENT DOCUMENTS

| JP | 10-336703 A | 12/1998 |
|---|---|---|
| JP | 2000-098871 A | 4/2000 |
| JP | 2001-036837 A | 2/2001 |
| JP | 2003-333623 A | 11/2003 |

OTHER PUBLICATIONS

International Search Report of PCT/JP2006/315374 filed Aug. 3, 2006, date of mailing Nov. 14, 2006.

* cited by examiner

*Primary Examiner* — Quan-Zhen Wang
*Assistant Examiner* — Yuk Chow
(74) *Attorney, Agent, or Firm* — Young & Thompson

(57) ABSTRACT

An image display device is provided with a display section (10) for displaying a two-dimensional image on a screen; a microlens array board (22), which is arranged in an optical path of display light constituting the two-dimensional image, and transmits the display light to display an actual image of the two-dimensional image on an imaging plane positioned in a space on a side opposite to the screen; and a display control section (100) for controlling the display section (10) to perform blocking process to have a part of an actual object on a side further than the imaging plane not seen by an observer who observes the imaging plane.

10 Claims, 16 Drawing Sheets

[FIG. 1]
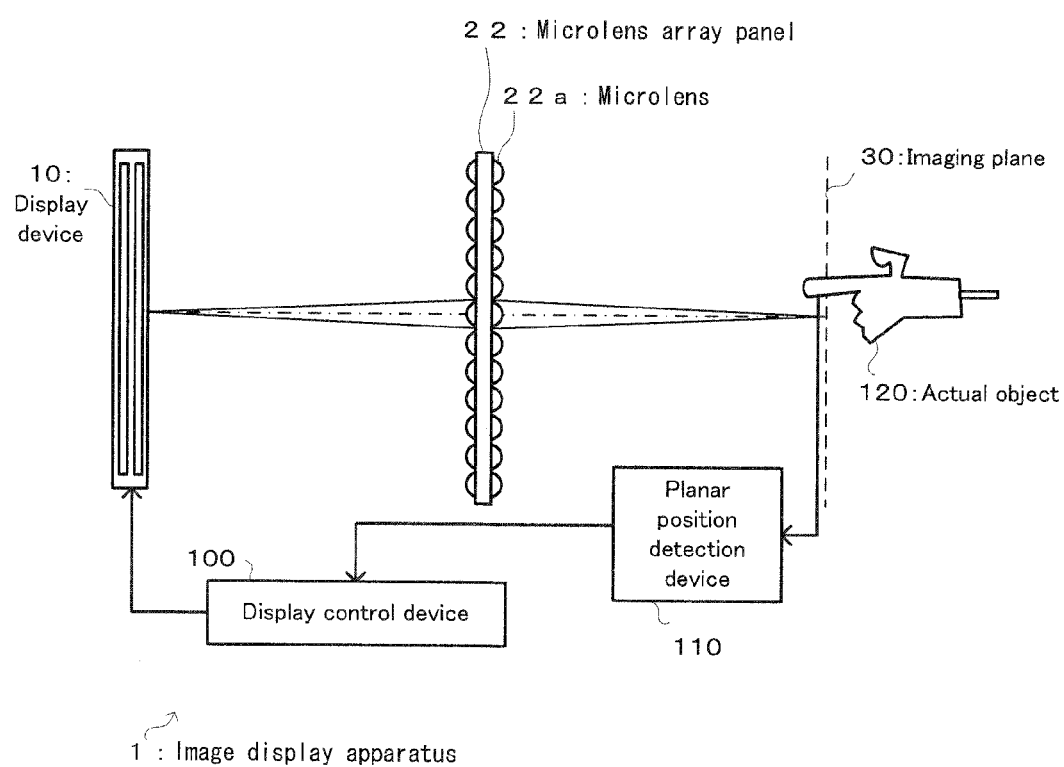

[FIG. 2]
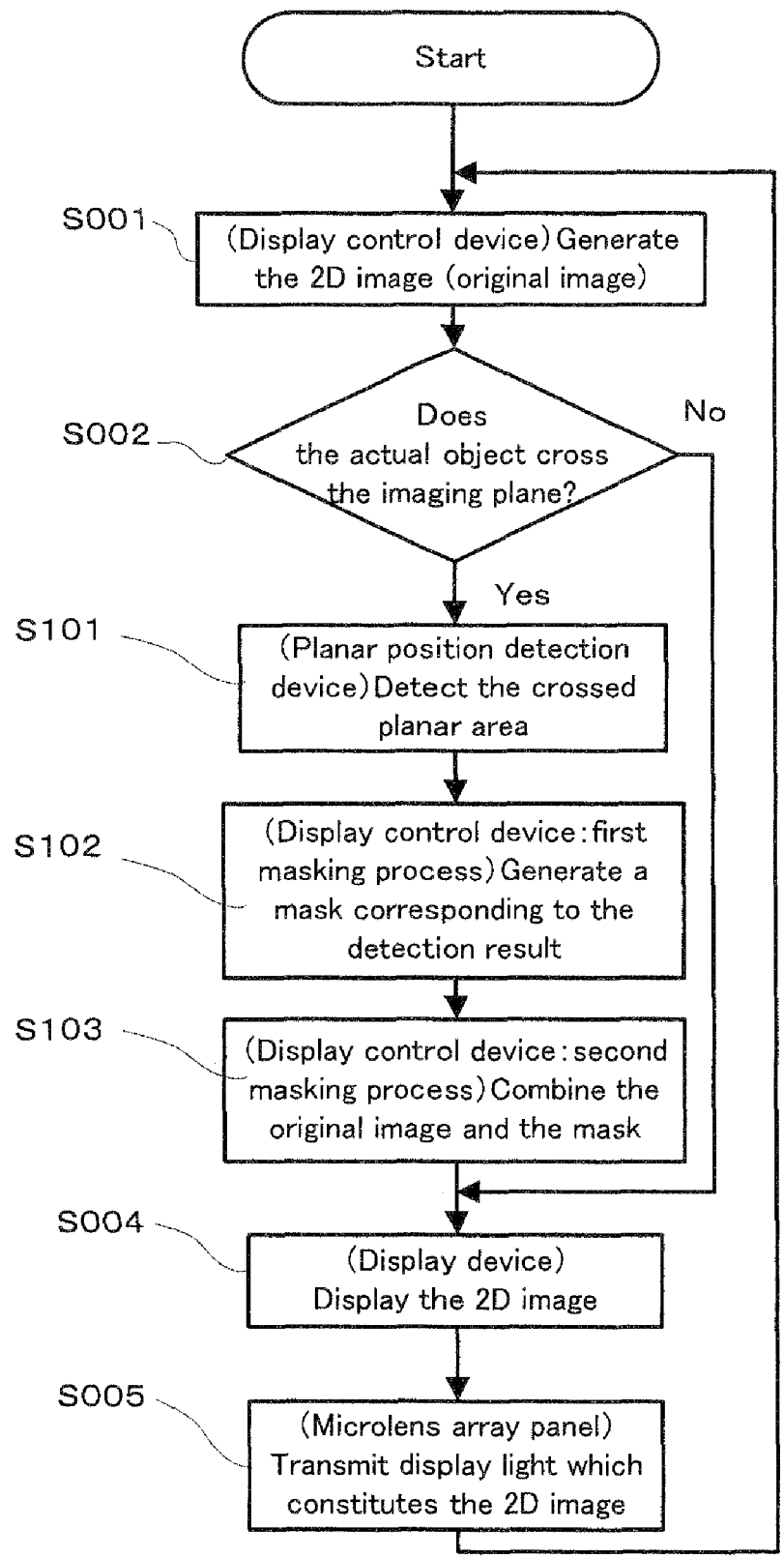

[FIG. 3]
(a)
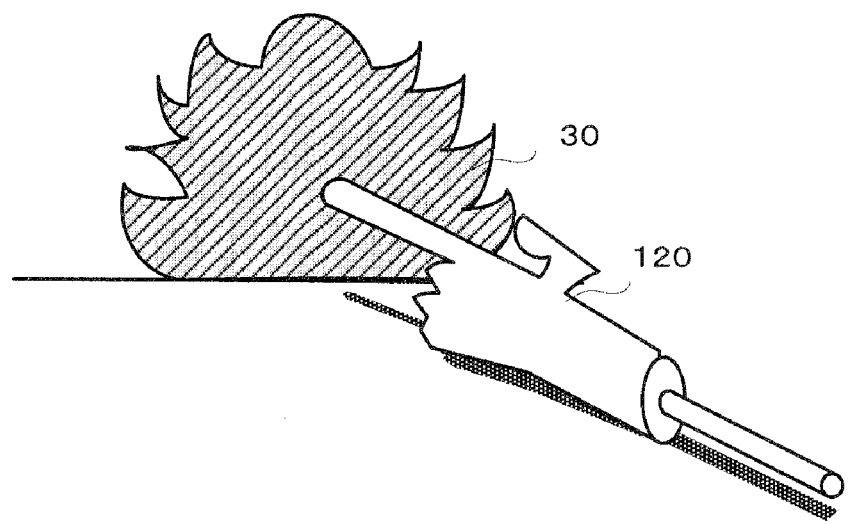
(b)
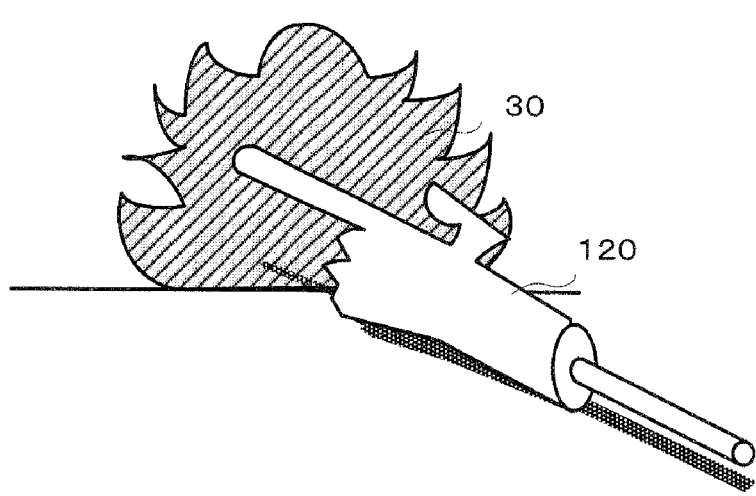
(c)
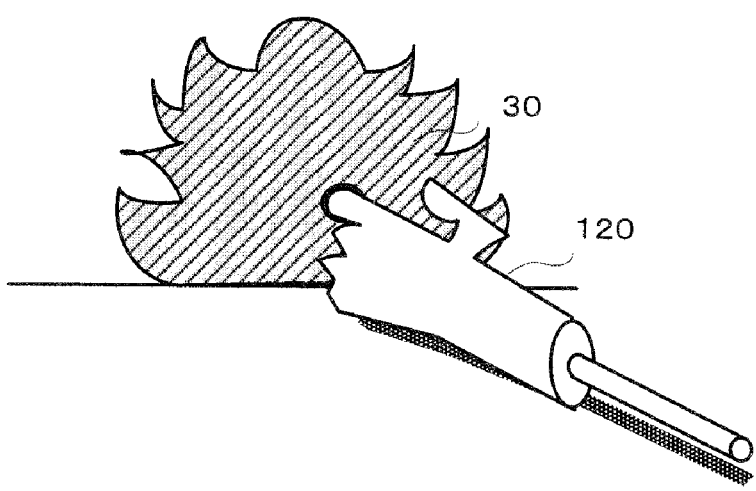

[FIG. 4]
(a)
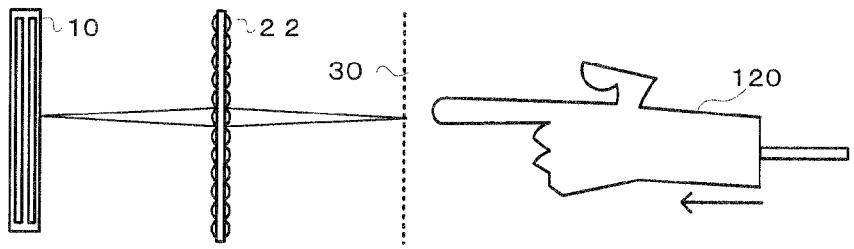
(b)
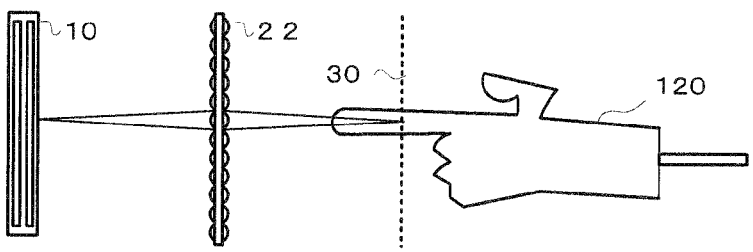
(c)
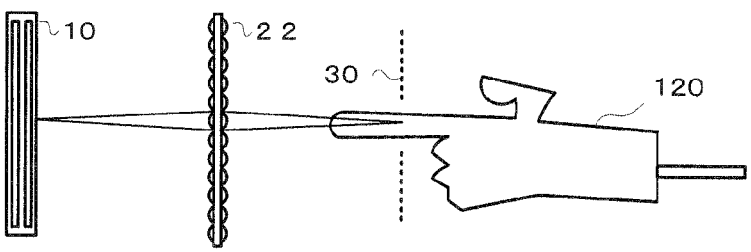
[FIG. 5]
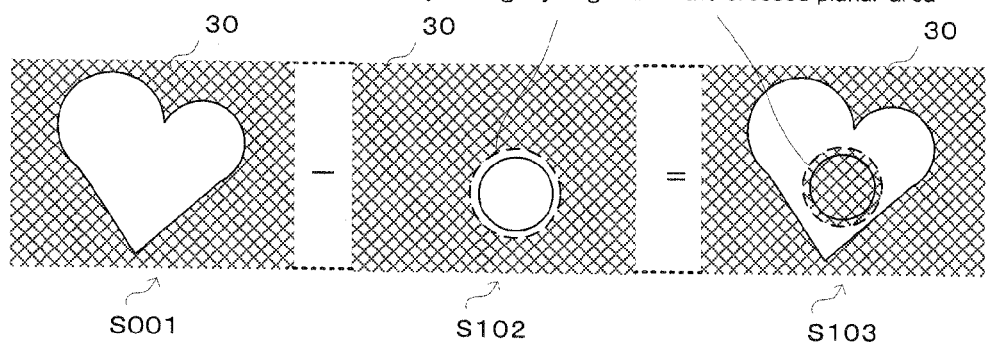

[FIG. 6]
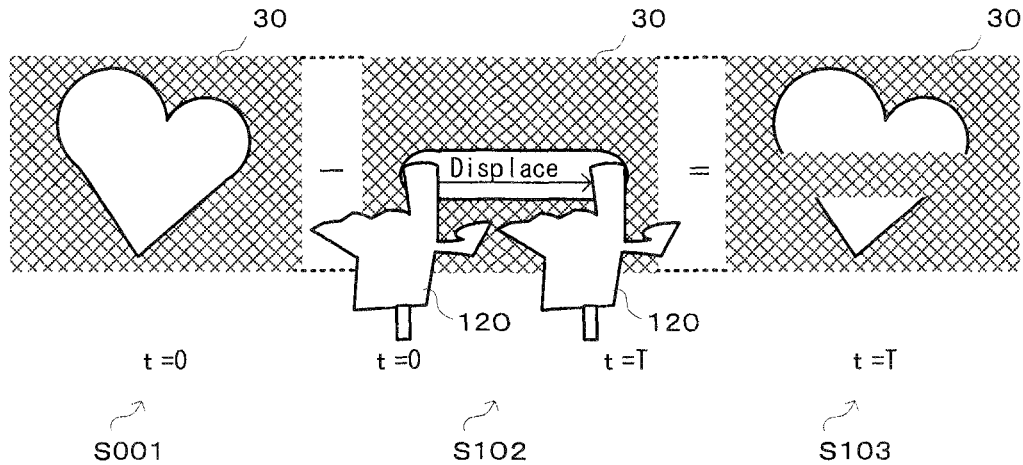
[FIG. 7]
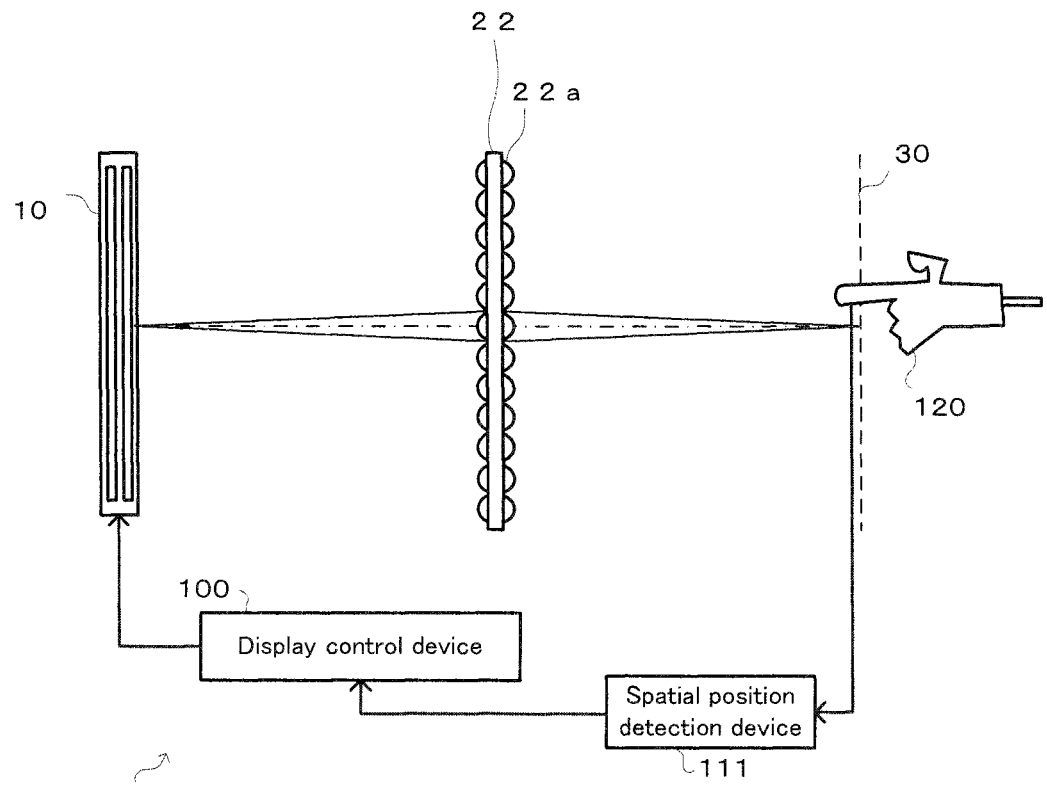

[FIG. 8]
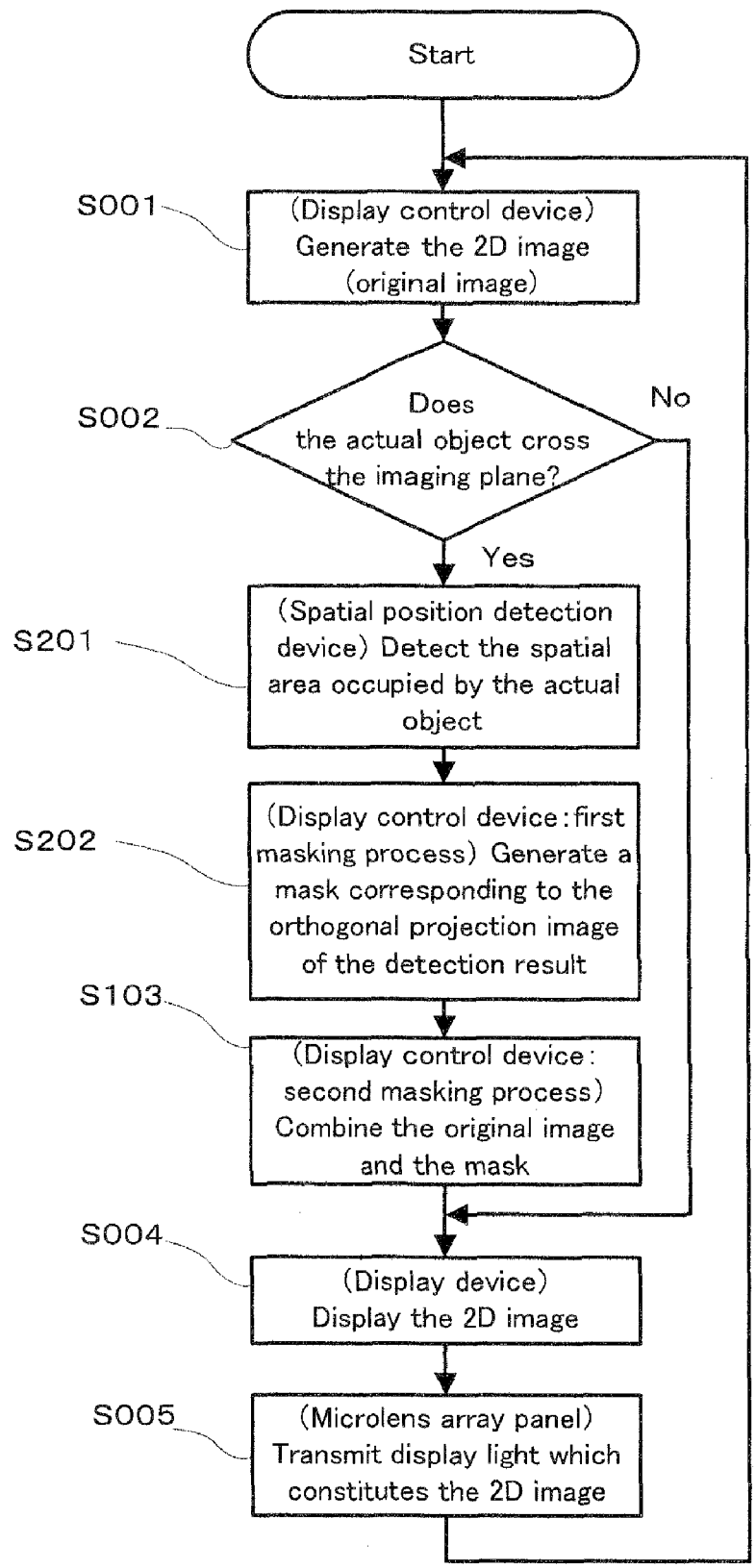

[FIG. 9]
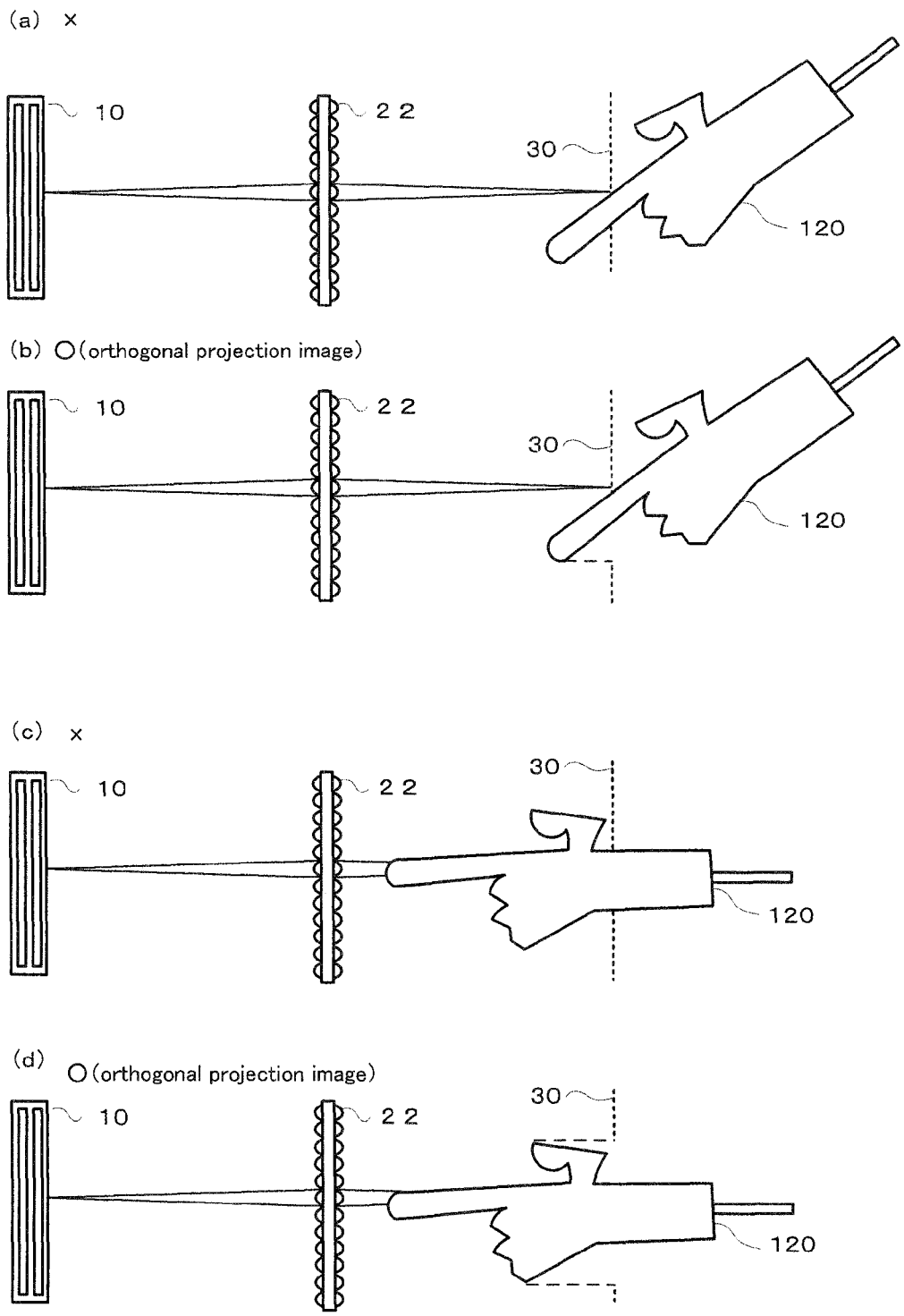

[FIG. 10]
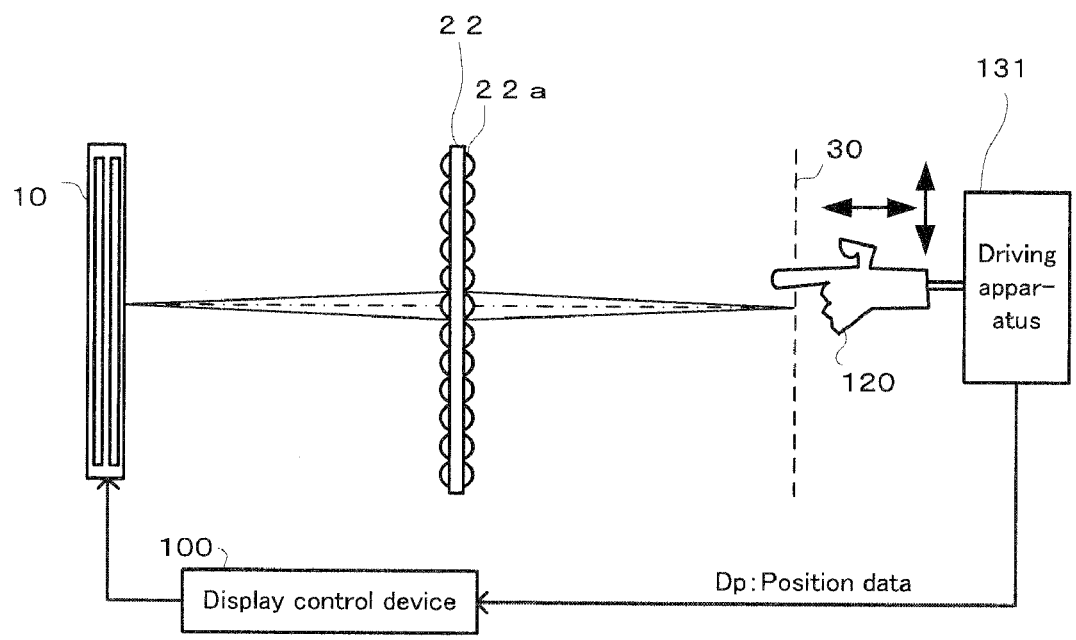

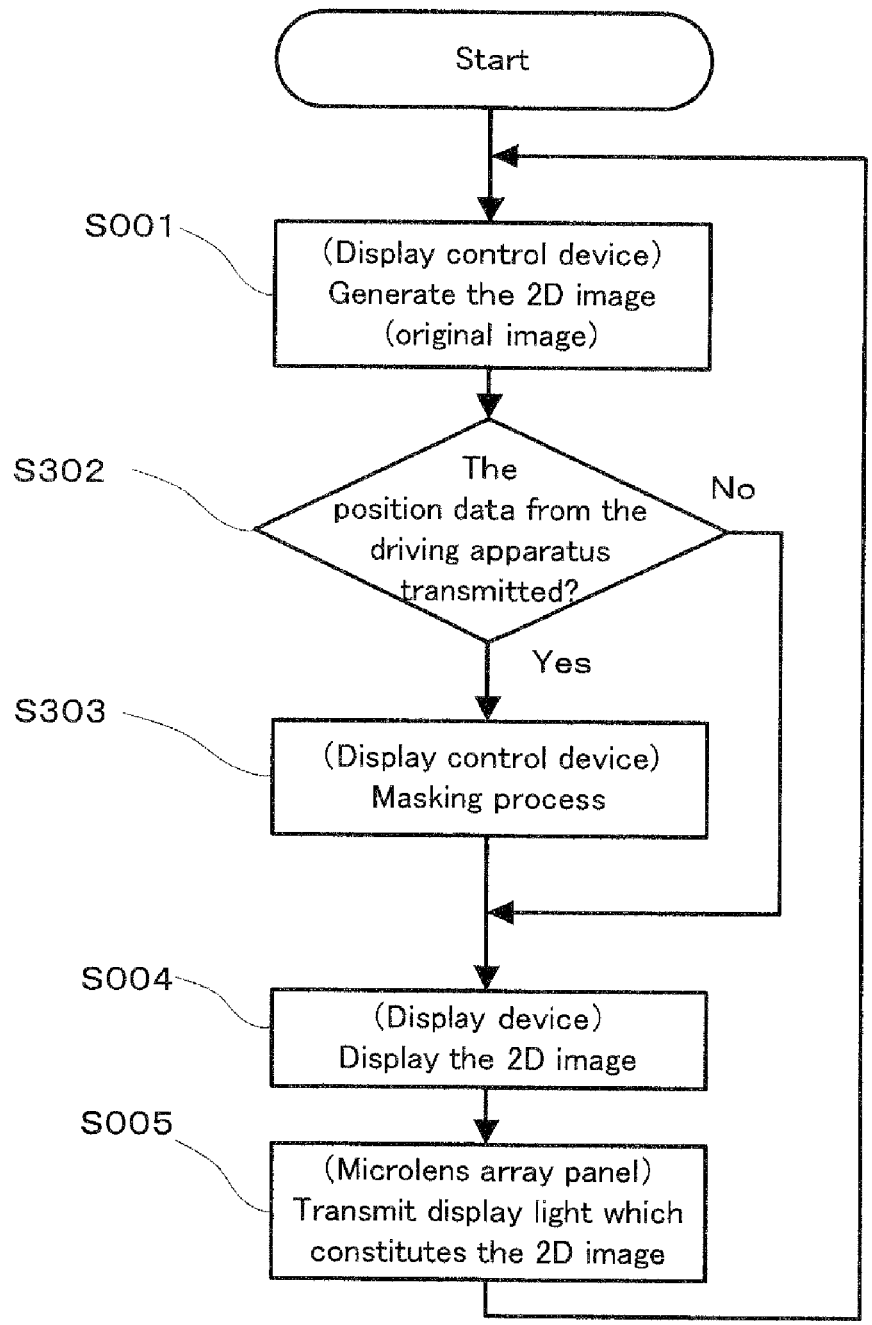
[FIG. 11]

[FIG. 12]
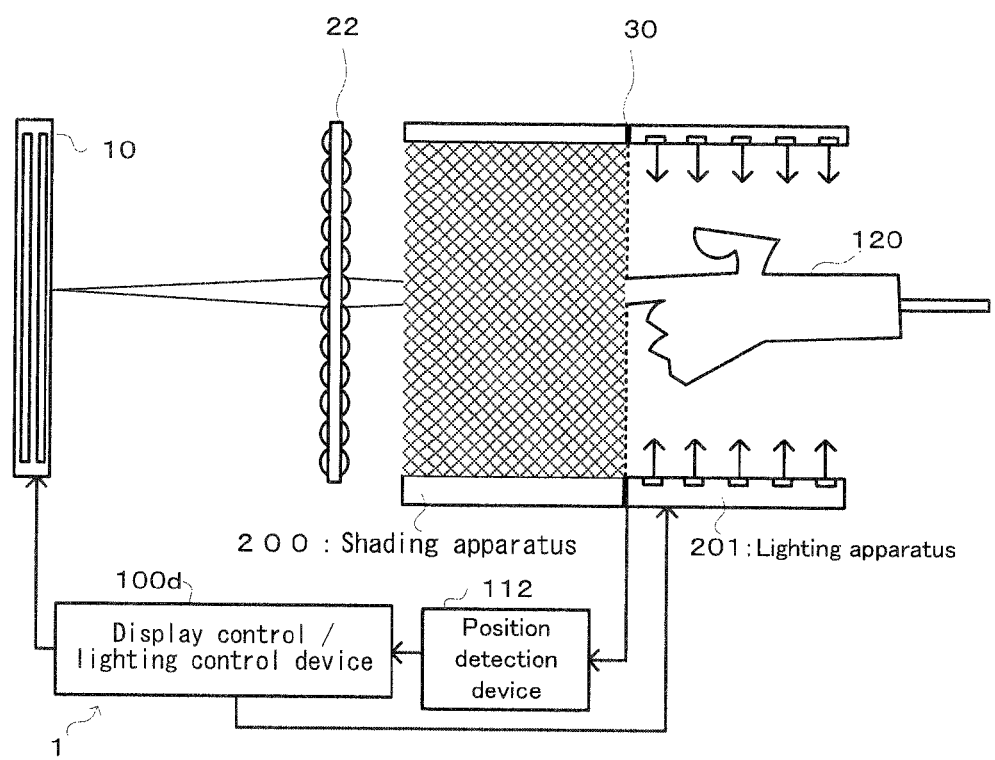

[FIG. 13]
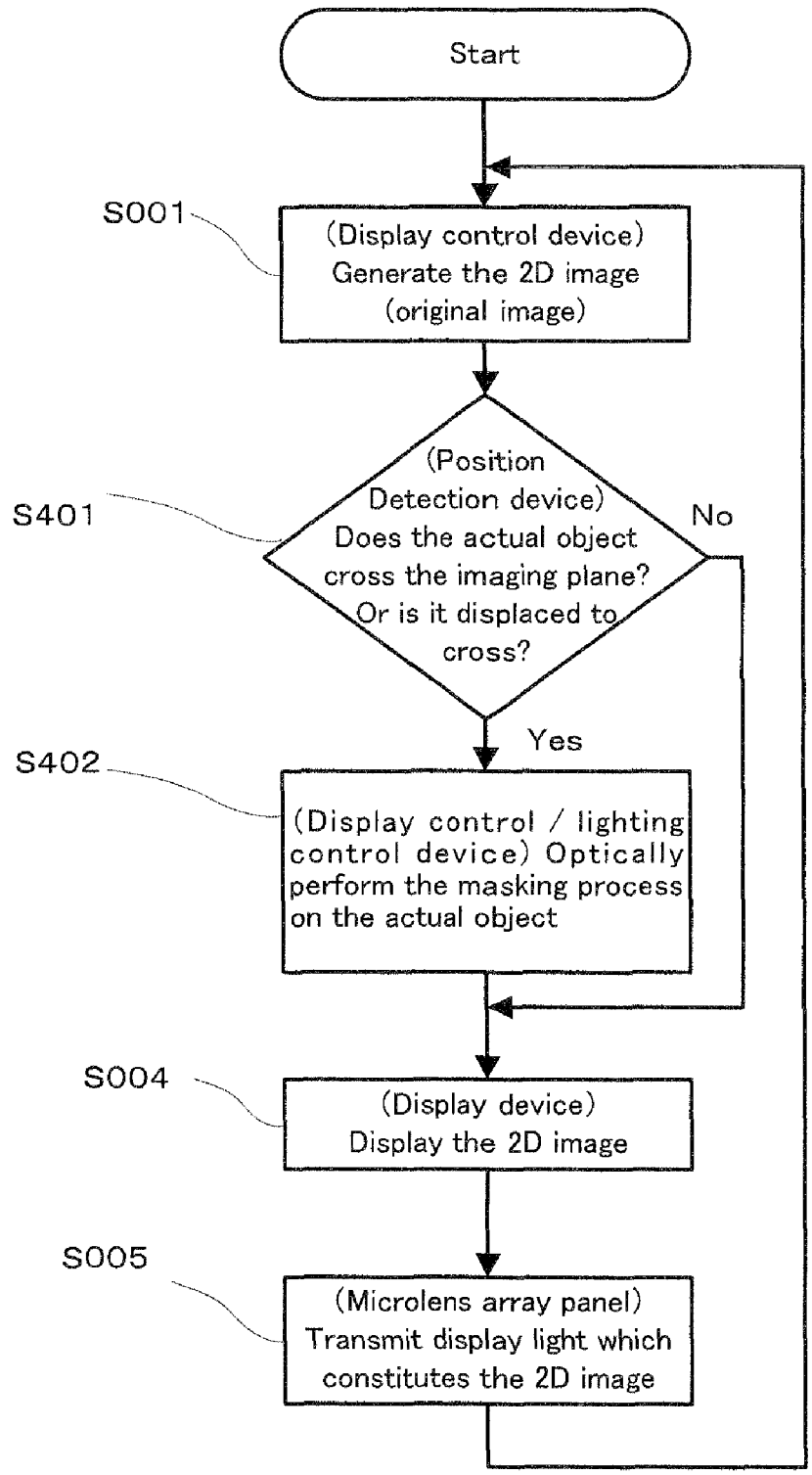

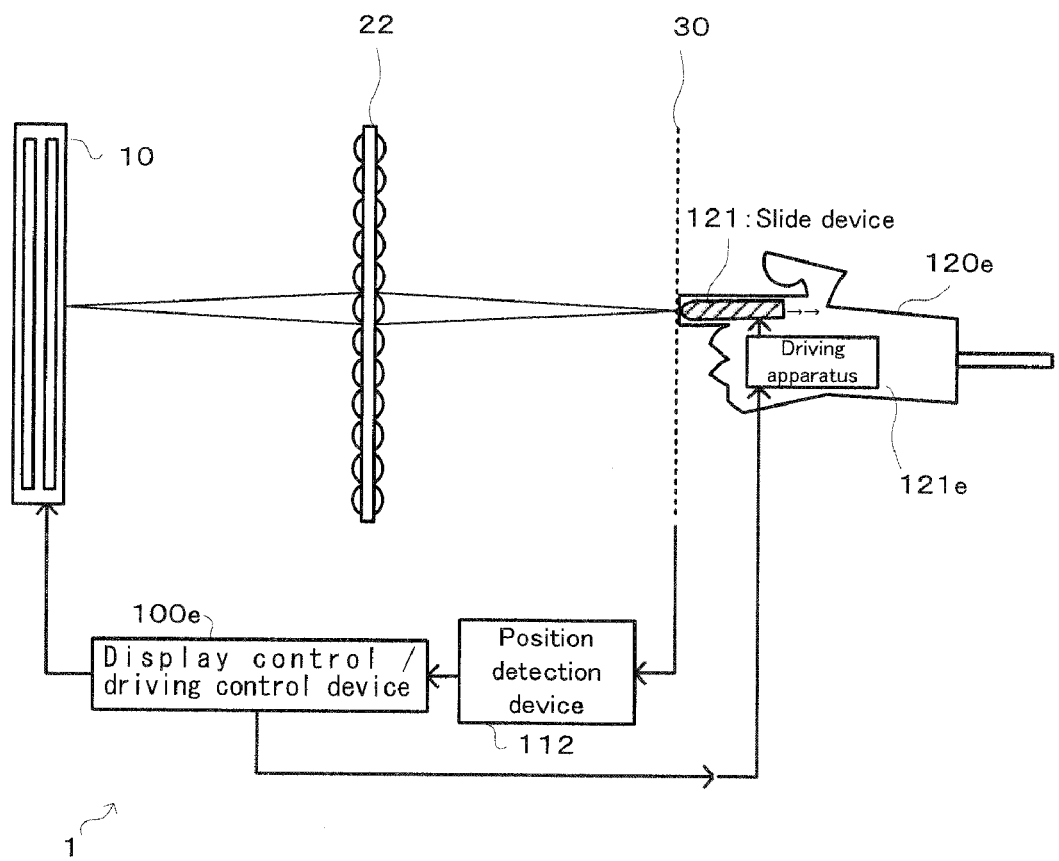
[FIG. 14]

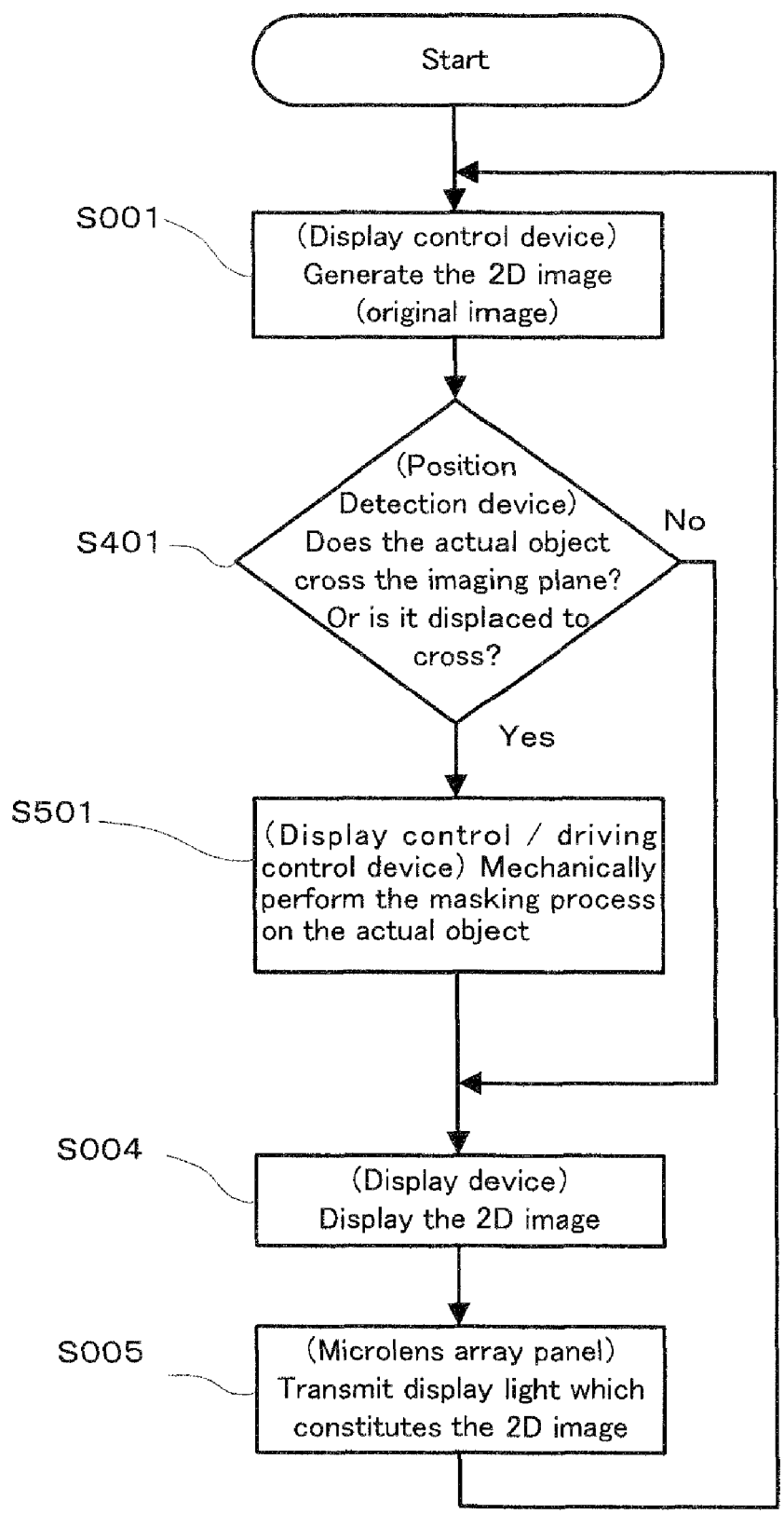
[FIG. 15]

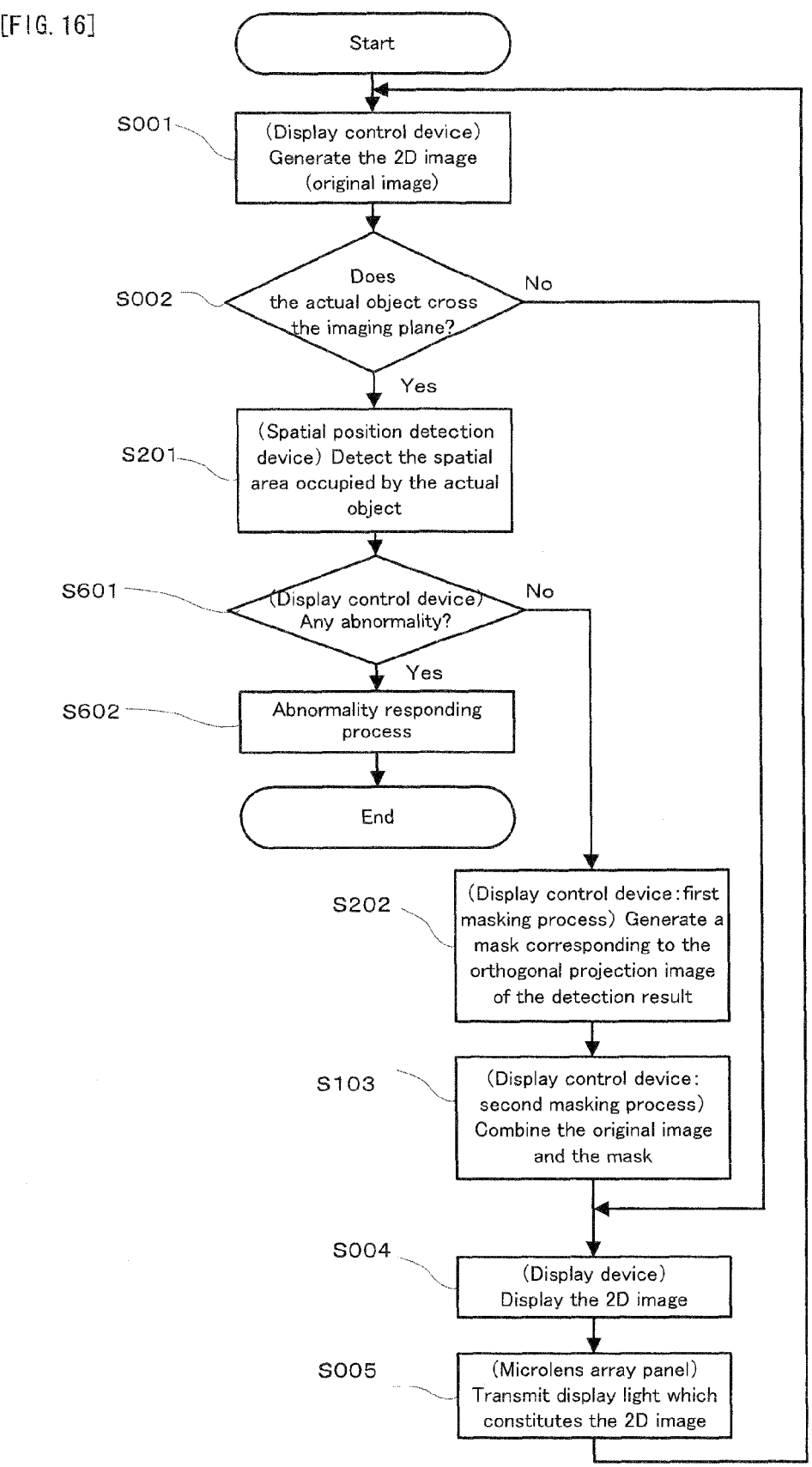

[FIG. 17]
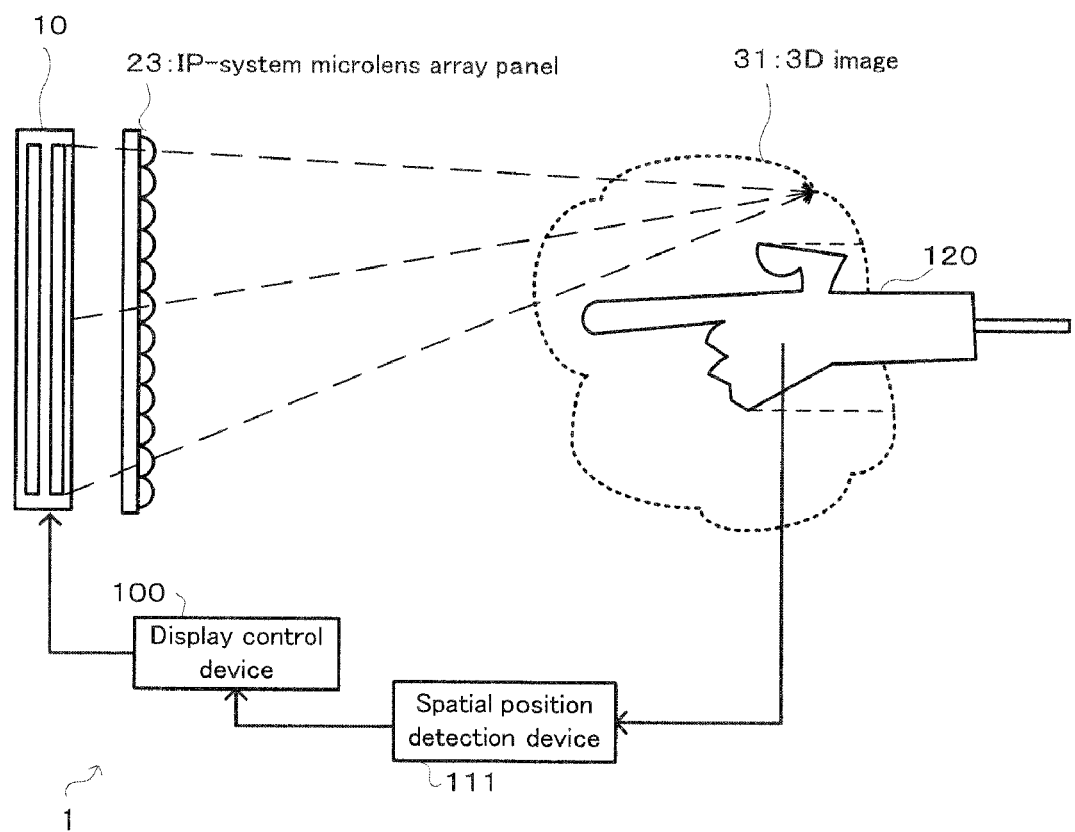

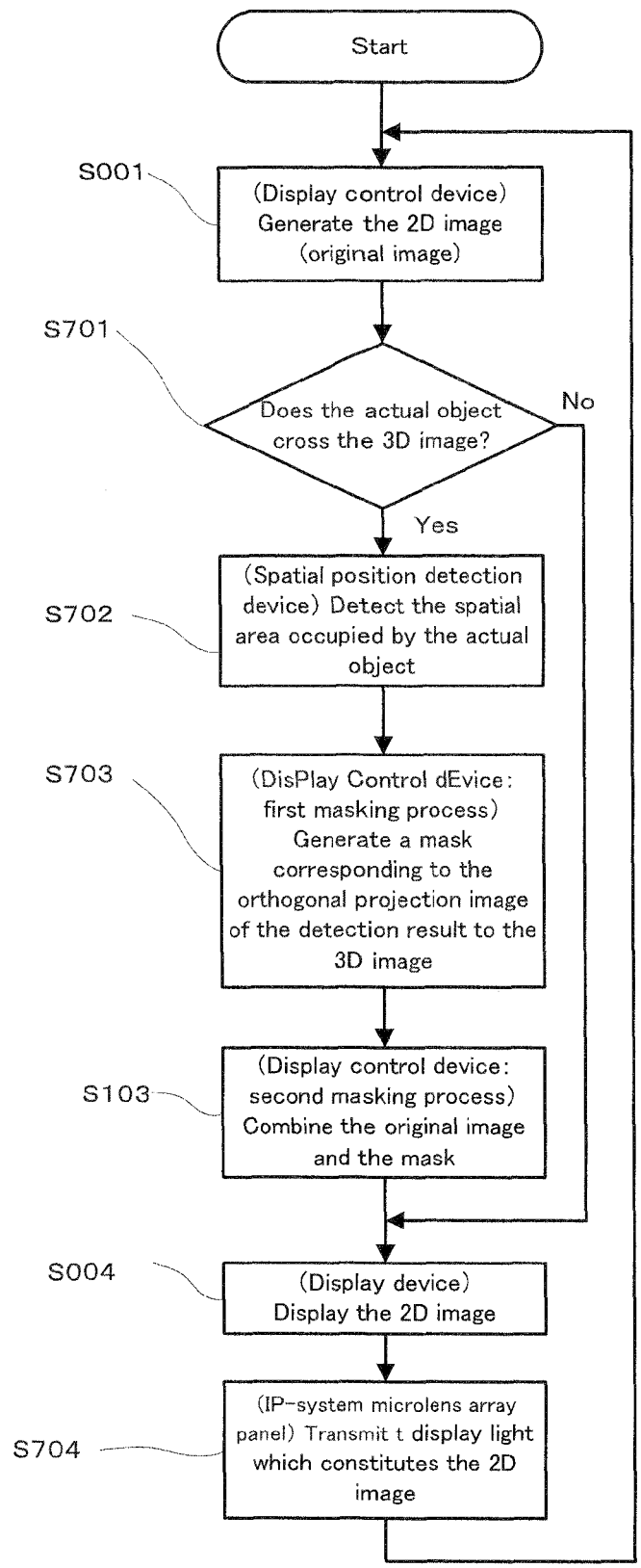
[FIG. 18]

IMAGE DISPLAY APPARATUS

TECHNICAL FIELD

The present invention relates to an image display apparatus, such as a 3D (Dimension) image display apparatus and a stereoscopic image display apparatus.

BACKGROUND ART

In the case that a stereo image is displayed, there are known, for example, a technology using polarized glasses and a technology using a lenticular lens. However, in the former case, it is annoying to wear the polarized glasses. On the other hand, in the latter case, although there is no annoyance to wear the polarized glasses, a reduction in resolution can be a problem. Moreover, both technologies require the preparation of parallax images corresponding to both eyes of a viewer in advance. In order to deal with such a problem, for example, there has been suggested a technology represented by a 3D floating vision (registered trademark by the present inventors) method (refer to a patent document 1).
Patent Document 1: Japanese Patent Application Laid Open No. 2003-333623

DISCLOSURE OF INVENTION

Subject to be Solved by the Invention

However, for example, the technology disclosed in the patent document 1 described above may have the following problem.

That is, in the technology disclosed in the patent document 1, there may be a sense of discomfort in fusing an actual object and a 3D image displayed on an imaging plane. For example, if the 3D image is disposed around the middle of the depth of the actual object, in some cases it looks like the 3D image is hidden in the actual object located in the rear of the 3D image. Thus, it is possibly hard to understand an anteroposterior relationship. As described above, conventionally there is such a technical problem that the actual object and the 3D image displayed on the imaging plane cannot coexist properly.

In view of the aforementioned problems, it is therefore an object of the present invention to provide an image display control apparatus which provides the coexistence of the actual object and the 3D image or stereo image displayed on the imaging plane in a relatively simple structure.

Means for Solving the Subject

The above object of the present invention can be achieved by a first image display apparatus provided with: a displaying device for displaying a two-dimensional (2D) image on a screen; an image transmitting panel which is located on an optical path of display light which constitutes the two-dimensional image and which transmits the display light such that a formed image of the two-dimensional image is displayed on one planar surface located in a space opposite to the screen; and a display controlling device for controlling the displaying device to perform a masking process in which an image portion is made invisible from an observer looking at the formed image, on the image portion of the two-dimensional image corresponding to at least a planar area occupied by an actual object in the one planar surface, when the actual object located in the space opposite to the screen, with the one planar surface as a boundary, crosses the one planar surface.

According to the first image display apparatus of the present invention, in its operation, the 2D image is displayed on the screen by the displaying device, such as a plasma display apparatus, an organic or inorganic EL (Electro Luminescence) display apparatus, a liquid crystal apparatus, and a CRT (Cathode Ray Tube) apparatus. By using the image transmitting panel, which is, e.g., a microlens array panel, located on the optical path of the display light which constitutes the 2D image, the formed image (typically, a real image) of the 2D image is displayed on the one planar surface located in the space opposite to the screen of the displaying device, as viewed from the image transmitting panel. By this, for example, 3D image display or stereoscopic image display by the 3D floating vision (registered trademark by the present inventors) method is performed. For example, the real image looks like floating on the front side of the image transmitting panel, as viewed from the observer who is in front of the screen of the displaying device through the image transmitting panel. In this method, video images for the right eye and the left eye are not required, and the floating 3D image display can be performed on an arbitrary video image. Incidentally, the "3D image display or stereoscopic image display" in the present invention includes a display method in which the formed image is separated from the surface of the image transmitting panel as described above, i.e., in which the formed image looks like floating from the front surface of the image transmitting panel. Of course, it also includes a display method which uses a virtual image in addition to the method in which the real image looks like floating. Moreover, in the first image display apparatus, as a matter of convenience, the imaging plane is treated as the planar surface; however, the "planar surface" of the present invention is not limited to the literal planar surface. That is, it also includes the case that the imaging plane is a curved surface. At this time, of course, the "planar area occupied by the actual object in the one planar surface" in the present invention may be a curved area.

If the 3D image display or stereoscopic image display is performed as described above, even if the actual object, such as a hand and an object, is held over the one planar surface in which the formed image is located (hereinafter simply referred to as an "imaging plane", as occasion demands), the actual object and the floating real image keep a stereoscopic positional relationship in the eyes of the observer. That is, the 3D image display or stereoscopic image display without unnaturalness can be performed the same as before the actual object is held over the real image. For example, even if a finger is held on the front side of the imaging plane, if the finger does not move to the rear of the imaging plane from the front of the image plane, in other words, as long as the actual object is located on the front side of the imaging plane, the 3D image display or stereoscopic image display is not damaged, and the 3D image display or stereoscopic image display can be performed including the natural actual object.

However, in the case that the actual object, such as a finger and an object, is put close to the image transmitting panel until it crosses the imaging plane, if no countermeasures are taken, the positional relationship apparently goes wrong between the formed image and the actual object which is in front of the formed image until shortly before the actual image crosses. That is mainly because the actual object interrupts the display light which reaches to the both eyes of the observer only in a portion where the display light is slightly different for the both eyes. Thus, for the observer, it looks like an extremely unnatural image which can be neither the 3D image nor the 2D image, like a so-called illusional picture. It has been discovered, from the study by the present inventors, that the display of the 3D image or stereoscopic image obtained until the last moment when at least the actual object crosses the imaging plane as described above is damaged because of the presence of the actual object portion which crosses.

According to the first image display apparatus of the present invention, however, when the actual object crosses the imaging plane, the masking process in which the image portion is made invisible from the observer is performed on the image portion of the 2D image, which is displayed by the displaying device and which corresponds to at least the planar area occupied by the actual object in the imaging plane, under the control of the display controlling device, such as a processing apparatus for processing an image signal. The "masking process" of the present invention in which the "image portion is made invisible" on the first image display apparatus is a process of changing the image portion to a background image or a black portion, selectively on the 2D image or the image data, or a process of displaying nothing, or the like. For example, the masking process can be performed relatively simply by such image processing that a black layer video image is separately prepared and superimposed on an original video image. Then, the formed image, which looks like floating until the masking process is performed, looks like it gets a hole in the formed image portion corresponding to the image portion, in the eyes of the observer.

Thus, when the observer looks at the combination of the actual object and the formed image, the actual object portion which crosses the imaging plane looks like it is located inside the hole in the formed image with the open hole. That is, it is possible to avoid that the display of the natural 3D image or stereoscopic image obtained until the last moment when at least the actual object crosses the imaging plane is damaged because of the presence of the actual object portion which crosses. At this time, the effectiveness of the 3D image display or stereoscopic image display is maintained, regardless of whether or not the actual object crosses the imaging plane.

Incidentally, if the crossing of the actual object with the imaging plane is ended because of the displacement of the actual object in a direction of returning to the observer side, the masking process is canceled.

As a result, according to the first image display apparatus of the present invention, even if the actual object, such as a finger and an object, is superimposed on the formed image in the 3D image display or stereoscopic image display, it is possible to provide natural display without bringing discomfort on the 3D image display or stereoscopic image display.

Incidentally, the first image display apparatus can be applied to a method in which the 3D image or stereoscopic image is damaged because of the presence of the actual object which interrupts a light beam of the 3D image or stereoscopic image reaching to the observer, from among a display method in which another virtual image is displayed as the stereoscopic image and an IP (Integral Photography) method in which another real image is displayed to form the 3D image with a depth in a space, in addition to the 3D image display or stereoscopic image display in which the real image is displayed by the aforementioned 3D floating vision method. A reasonable effect can be obtained in the above methods. Moreover, of course, such a technology that the virtually effective or psychological 3D image or stereoscopic image is displayed by adjusting perspective, lighting, and contrast can be also applied to the present invention.

In one aspect of the image display apparatus of the present invention, it is further provided with a planar position detecting device for detecting the planar area when the actual object crosses the one planar surface, the display controlling device controlling the displaying device to perform the masking process on the image portion corresponding to the detected planar area.

According to this aspect, if the actual object, such as a finger, crosses the imaging plane, the crossed planar area is detected by the planar position detecting device, such as various noncontact touch sensors and a camera-type sensor. At this time, the mounting position of the camera-type sensor is arbitrary, such as in the rear of the displaying device, in the rear of the observer, or on the side of the image transmitting panel or the observer. The detection result of the planar area is obtained as a set of XY coordinates in the imaging plane, for example. Then, under the control of the display controlling device, the masking process is performed by the displaying device on the image portion corresponding to the detected planar area. As described above, even if the actual object enters between the imaging plane and the image transmitting panel beyond the imaging plane, because the masking process is performed as feedback, it is possible not to provide unnatural display caused by the actual object superimposed on the formed image, without bringing discomfort on the 3D image display or stereoscopic image display.

As described above, even if the actual object is an actual object which makes an arbitrary and unexpected move, such as a finger, it is possible to provide natural display without bringing discomfort on the 3D image display or stereoscopic image display, by performing the masking process as feedback.

In another aspect of the image display apparatus of the present invention, it is further provided with a spatial position detecting device for detecting a spatial area occupied by the actual object in a space between the one planar surface and the image transmitting panel, in addition to the planar area, when the actual object crosses the one planar surface, the display controlling device controlling the displaying device to perform the masking process on the image portion corresponding to the detected spatial area.

According to this aspect, if the actual object, such as a finger, crosses the imaging plane, the crossed spatial area is detected by the spatial position detecting device, such as various noncontact touch sensors and a camera-type sensor. The detection result of the spatial area is obtained as a set of XY coordinates in the imaging plane, for example. Then, under the control of the display controlling device, the masking process is performed by the displaying device on the image portion corresponding to the detected spatial area. As described above, even if the actual object enters into the spatial area in which the formed image is located, because the masking process is performed as feedback, it is possible not to provide unnatural display caused by the actual object superimposed on the formed image, without bringing discomfort on the 3D image display or stereoscopic image display. Incidentally, with regard to the detection of the crossed spatial area, a plurality of planar position detecting devices may be arranged in piles at predetermined intervals, to thereby obtain the set of XY coordinates for a plurality of Zs. Alternatively, there may be provided one stereoscopic position detecting device equipped with a sensor capable of directly measuring XYZ coordinates. Moreover, simply, the detection result from one planar position detecting device may be held in a memory in the course of time, and the spatial area may be estimated as the set of the crossed planar areas related to the actual object passing through the imaging plane.

Incidentally, the detection of the planar position and the spatial position as described above may be static or dynamic. The static detection herein means that the shape and the position of the actual object are registered in advance in a memory and the planar area or spatial area crossed by the actual object is detected or specified on the basis of the registered information. On the other hand, the dynamic detection means that the planar area or spatial area crossed by the actual object is detected or specified, including the actual motion of the actual object, by using various sensors, such as an XYZ sensor, a CCD image sensor disposed to capture the imaging plane in the front, an infrared sensor, and an ultrasonic sensor.

In this aspect, the display controlling device may control the displaying device to perform the masking process on the image portion corresponding to a planar area in which the spatial area is orthogonally projected on the one planar surface, as the image portion corresponding to the detected spatial area.

By virtue of such construction, it is possible to specify the image portion corresponding to the spatial area, relatively easily, and to perform the masking process on the image portion, quickly.

In another aspect of the image display apparatus of the present invention, it is further provided with a displacing device for displacing the actual object in a direction of crossing the one planar surface, the display controlling device controlling the displaying device to perform the masking process in conjunction with the displacement by the displacing device.

According to this aspect, in its operation, if the actual object, such as a mechanical part for amusement application, crosses the imaging plane because of the displacement by the displacing device, the masking process is performed by the displacing device in conjunction with the displacement by the displacing device, under the control of the display controlling device. Incidentally, the direction of the displacement by the displacing device may be a normal direction of the imaging plane and a direction of crossing obliquely.

As described above, even if the actual object is an actual object which makes a predetermined move, such as a mechanical part, it is possible to provide natural display without bringing discomfort on the 3D image display or stereoscopic image display, by performing the masking process as feed-forward.

In another aspect of the image display apparatus of the present invention, the display controlling device controls the displaying device to perform the masking process on the image portion corresponding to an area which is slightly larger than the planar area by a predetermined margin, when the actual object crosses the one planar surface.

According to this aspect, it is possible to avoid the disadvantage expected in the case that the predetermined margin is not provided. That is, as long as there is no difference in the angle of sight between the both eyes of the observer and the observer observes in front of the formed image, the predetermined margin is hardly or not required at all. For example, if a finger is inserted in the formed image, it looks like it is completely inserted. In reality, however, it is general that there is some difference in the angle of sight between the both eyes of the observer and that the observer observes at a position off the front more or less. Thus, if the predetermined margin is not provided, the 3D image display or stereoscopic image display is possibly damaged around the finger, which may cause unnatural display. Thus, as in this aspect, it is extremely useful in practice to perform the masking process on the image portion corresponding to the area which is slightly larger than the planar area crossed by the actual object in the formed image, by the predetermined margin.

(Second Image Display Apparatus)

The above object of the present invention can be also achieved by a second image display apparatus provided with: a displaying device for displaying a two-dimensional image on a screen; an image transmitting panel which is located on an optical path of display light which constitutes the two-dimensional image and which transmits the display light such that a formed image of the two-dimensional image is displayed on one planar surface located in a space opposite to the screen; and a masking process device for performing a masking process in which an actual object portion is made invisible from an observer looking at the formed image, on the actual object portion of the actual object which is closer to or is displaced to be closer to the image transmitting panel than the one planar surface, when the actual object located in the space opposite to the screen, with the one planar surface as a boundary, crosses or is displaced to cross the one planar surface.

According to the second image display apparatus of the present invention, in its operation, the 3D image display or stereoscopic image display is performed, as in the aforementioned first image display apparatus. Then, in the case that the actual object, such as a finger and an object, is put close to the image transmitting panel until it crosses the imaging plane, if no countermeasures are taken, the display of the 3D image or stereoscopic image is damaged because of the presence of the actual object portion which crosses.

According to the second image display apparatus of the present invention, however, if the actual object crosses or is displaced to cross the imaging plane, the masking process in which the actual object portion is made invisible from the observer looking at the formed image is performed by the masking process device on the actual object portion of the actual object displaced to be close to the image transmitting panel than the imaging plane. The "masking process" of the present invention in which the "actual object portion is made invisible" on the second image display apparatus is a process in which the actual object portion is relatively darken in order not to be seen selectively from the observer, a process in which the actual object portion is actually pulled or modified mechanically or physically, or a process in which the actual object portion is chemically eliminated, or the like. The actual object portion which exists until such a masking process is performed looks like it is inserted in the formed image on the rear side of the formed image, in the eyes of the observer. That is, the actual object portion on the rear side of the imaging plane is not seen because it looks dark from the observer or because it does not exist.

Thus, when the observer looks at the combination of the actual object and the formed image, the actual object portion which crosses the imaging plane looks like it is located in the formed image. That is, it is possible to avoid that the display of the natural 3D image or stereoscopic image obtained until the last moment when at least the actual object crosses the imaging plane is damaged because of the presence of the actual object portion which crosses. At this time, the effectiveness of the 3D image display or stereoscopic image display is maintained, regardless of whether or not the actual object crosses the imaging plane.

As a result, according to the second image display apparatus of the present invention, even if the actual object, such as a finger and an object, is superimposed on the formed image in the 3D image display or stereoscopic image display, it is possible to provide natural display without bringing discomfort on the 3D image display or stereoscopic image display.

In one aspect of the second image display apparatus of the present invention, the masking process device performs the masking process by darkening the closer actual object portion more than an actual object portion of the actual object other than the closer actual object portion, when the actual object crosses the one planar surface.

According to this aspect, by relatively darkening the actual object portion located on the rear side of the imaging plane, the actual object portion cannot be seen certainly. For example, if relatively strong light is irradiated on the actual object portion (e.g. back of a hand and an arm) located on the front side of the imaging plane as viewed from the observer and the actual object portion (e.g. a finger tip and a palm) located on the rear side of the imaging plane is covered with a shading member or is not irradiating with light, to thereby increase a contrast ratio between the both portions, the actual object portion located on the rear side of the imaging plane cannot be seen, relatively easily and certainly.

Alternatively, in another aspect of the second image display apparatus of the present invention, the masking process device performs the masking process by modifying a stereo shape of the actual object such that the actual object portion which is displaced to be closer does not physical exist, when the actual object is displaced to cross the one planar surface.

According to this aspect, by modifying the actual object portion located on the rear side of the imaging plane or the actual object portion displaced to the rear side of the imaging plane, by a mechanical, physical, or chemical operation, the actual object portion cannot be seen, more certainly. That is, since the actual object portion, which actually interrupts the formed image, does not physically exist, the 3D image display or stereoscopic image display is not damaged. Incidentally, if such an actual object is a mechanical part for amusement application or the like and only makes a planned move, this aspect is realized relatively easily and inexpensively, by employing an elastic mechanism or the like.

Incidentally; as in the first image display apparatus, as a matter of convenience, the second image display apparatus also treats the imaging plane as the planar surface; however, the "planar surface" of the present invention is not limited to the literal planar surface. That is, it also includes the case that the imaging plane is a curved surface. At this time, of course, the "planar area occupied by the actual object in the one planar surface" in the present invention may be a curved area.

In another aspect of the aforementioned first or second image display apparatus, it is further provided with: an abnormality judging device for judging that the image display apparatus is abnormal if the planar area or a spatial area occupied by the actual object in a space between the one planar surface and the image transmitting panel exceeds a threshold value related to an area, a volume, or a range set in advance, or if a distance between the actual object and the screen exceeds a threshold value related to a distance set in advance; and an abnormality responding device for performing a predetermined type of abnormality responding process if it is judged to be abnormal.

According to this aspect, if the actual object, such as a finger and a hand, is displaced to the rear of the imaging plane so much that it comes in contact with the surface of the image transmitting panel, or if the crossed planar area or spatial area becomes extremely larger than the formed image and thus the 3D image display or stereoscopic image display by the image formation no longer has a practical meaning, it is judged to be abnormal by the abnormality judging device. Then, if it is judged to be abnormal by the abnormality judging device, the predetermined type of abnormality responding process is performed. For example, a warning message may be outputted as an image or sound, and at the same time, the display operation of the 2D image by the displaying device may be temporarily stopped.

(Third Image Display Apparatus)

The above object of the present invention can be also achieved by a third image display apparatus provided with: a displaying device for displaying a two-dimensional image on a screen; an image transmitting panel which is located on an optical path of display light which constitutes the two-dimensional image and which transmits the display light such that a formed image of the two-dimensional image is displayed on one planar surface located in a space opposite to the screen; and a masking device for making it harder for an observer looking at the formed image to see an actual object portion which is closer to the image transmitting panel than the one planar surface of an actual object partially located in a space opposite to the screen, with the one planar surface as a boundary, than to a portion of the actual object other than the actual object portion.

According to the third image display apparatus of the present invention, in its operation, the 3D image display or stereoscopic image display is performed as in the aforementioned first image display apparatus. Then, in the case that the actual object, such as a finger and an object, is put close to the image transmitting panel until it crosses the imaging plane, if no countermeasures are taken, the display of the 3D image or stereoscopic image is damaged because of the presence of the actual object portion which crosses.

According to the third image display apparatus of the present invention, however, if the actual object crosses the imaging plane, the masking device makes it harder for the observer to see the actual object portion of the actual object which is closer to the image transmitting panel than the imaging plane, than to see the portion of the actual object other than the actual object portion. The expression "to make it harder to see . . . " in the present invention means that how the actual object looks is changed more or less, with the imaging plane as a boundary, such as to relatively darken the actual object portion beyond the imaging plane to thereby make it hard for the observer to see it, or to relatively lighten the other portion to thereby make it easy for the observer to see it. Moreover, it means that it is harder to see the actual object portion on the side closer to the image transmitting panel than the imaging plane. For example, if relatively strong light is always irradiated on the actual object portion (e.g. back of a hand and an arm) located on the front side of the imaging plane as viewed from the observer and the actual object portion (e.g. a finger tip and a palm) located on the rear side of the imaging plane is always covered with a shading member or is not irradiating with light, to thereby increase a contrast ratio between the both portions, it is possible to make it hard to see the actual object portion located on the rear side of the imaging planerelatively easily and certainly.

Thus, as the observer looks at the combination of the actual object and the formed image, it looks like the actual object portion which crosses the imaging plane is located inside the formed image.

As a result, according to the third image display apparatus of the present invention, even if the actual object, such as a finger and an object, is superimposed on the formed image in the 3D image display or stereoscopic image display, it is possible to provide natural display without bringing discomfort on the 3D image display or stereoscopic image display, in a relatively simple structure.

Incidentally, as in the first image display apparatus, as a matter of convenience, the third image display apparatus also treats the imaging plane as the planar surface; however, the "planar surface" of the present invention is not limited to the literal planar surface. That is, it also includes the case that the imaging plane is a curved surface. At this time, of course, the "planar area occupied by the actual object in the one planar surface" in the present invention may be a curved area.

(Fourth Image Display Apparatus)

The above object of the present invention can be also achieved by a fourth image display apparatus provided with: a 3D displaying device for displaying a 3D image for an observer; and a controlling device for (i) performing one masking process in which an image portion is made invisible from the observer, on the image portion of the 3D image in which a paradox is about to be produced, or (ii) performing another masking process in which an actual object portion is made invisible from the observer, on the actual object portion of an actual object in which a paradox is about to be produced, in accordance with the presence of the actual object which is about to produce the paradox for the displayed 3D image, as viewed from the observer, by partially interrupting a light beam leading to the observer of the 3D image.

According to the fourth image display apparatus of the present invention, in its operation, the 3D image display or stereoscopic image display is performed substantially as in the aforementioned first image display apparatus. In the fourth image display apparatus, however, the 3D image or stereoscopic image displayed by the 3D image displaying device is any existing type of 3D image or stereoscopic image obtained by using a virtual image in a binocular disparity method, a real image in the IP method in which the 3D image with a depth in a space is formed by displaying another real image, a 3D floating vision method in which the imaging plane is a curved surface, in addition to the 3D floating vision method in which the imaging plane is the planar surface. In any case, if there is the paradox in the 3D image because of the presence of the actual object which interrupts the line of sight of the observer, one masking process in which the image portion is made invisible from the observer is performed on the image portion in which the paradox is about to be produced, substantially as in the aforementioned first image display apparatus. Alternatively, if there is the paradox in the 3D image because of the presence of the actual object which interrupts the line of sight of the observer, another masking process in which the image portion is made invisible from the observer is performed on the image portion in which the paradox is about to be produced, substantially as in the aforementioned second image display apparatus. Therefore, regardless of the content of the 3D display method or stereoscopic display method, it is possible to provide natural display without bringing discomfort on the 3D image display or stereoscopic image display, with or without the actual object, such as an object and a finger, being superimposed on the formed image.

Incidentally, the image transmitting panel is preferably provided with a microlens array.

As explained above in detail, the first image display apparatus is provided with the displaying device, the image transmitting panel, and the display controlling device. The second image display apparatus is provided with the displaying device, the image transmitting panel, and the masking process device. The third image display apparatus is provided with the displaying device, the image transmitting panel, and the masking device. The fourth image display apparatus is provided with the 3D image displaying device and the controlling device. Thus, regardless of the content of the 3D display method or stereoscopic display method, it is possible to provide natural display without bringing discomfort on the 3D image display or stereoscopic image display, with or without the actual object, such as an object and a finger, being superimposed on the formed image.

These effects and other advantages of the present invention will become more apparent from the embodiments explained below.

BRIEF DESCRIPTION OF DRAWINGS

FIG. 1 is a block diagram showing an image display control apparatus in a first embodiment of the present invention.

FIG. 2 is a flowchart showing the operations of the image display control apparatus in the first embodiment of the present invention.

FIG. 3 are a series of schematic perspective views to explain crossing (or fusion) of an actual object and an imaging plane in the first embodiment of the present invention.

FIG. 4 are a series of schematic cross sectional views to explain a masking process in the first embodiment of the present invention.

FIG. 5 is a schematic conceptual view to explain the masking process in the first embodiment of the present invention.

FIG. 6 is a schematic conceptual view to explain the situation that the trajectory of a cross area is stored to perform control in the first embodiment of the present invention.

FIG. 7 is a block diagram showing an image display control apparatus in a second embodiment of the present invention.

FIG. 8 is a flowchart showing the operations of the image display control apparatus in the second embodiment of the present invention.

FIG. 9 are a series of schematic cross sectional views to explain a masking process based on an orthogonal projection image in the first embodiment of the present invention.

FIG. 10 is a block diagram showing an image display control apparatus in a third embodiment of the present invention.

FIG. 11 is a flowchart showing the operations of the image display control apparatus in the third embodiment of the present invention.

FIG. 12 is a block diagram showing an image display control apparatus in a fourth embodiment of the present invention.

FIG. 13 is a flowchart showing the operations of the image display control apparatus in the fourth embodiment of the present invention.

FIG. 14 is a block diagram showing an image display control apparatus in a fifth embodiment of the present invention.

FIG. 15 is a flowchart showing the operations of the image display control apparatus in the fifth embodiment of the present invention.

FIG. 16 is a flowchart showing the operations of the image display control apparatus in a sixth embodiment of the present invention.

FIG. 17 is a block diagram showing an image display control apparatus in a seventh embodiment of the present invention.

FIG. 18 is a flowchart showing the operations of the image display control apparatus in the seventh embodiment of the present invention.

DESCRIPTION OF REFERENCE CODES 1 image display apparatus
10 display device
22 microlens array panel
22a microlens
23 IP-system microlens array panel
30 imaging plane
31 3D image
100 display control device
100d display control/lighting control device
100e display control/drive control device
110 planar position detection device 111 spatial position detection device
112 position detection device
120, 120e actual object
121 slide device
121e driving apparatus
131 driving apparatus
200 shading apparatus
201 lighting apparatus

BEST MODE FOR CARRYING OUT THE INVENTION

Hereinafter, the best mode for carrying out the invention will be explained in each embodiment in order, with reference to the drawings.

First Embodiment

An image display apparatus in this embodiment will be explained with reference to FIG. 1 to FIG. 6.

In FIG. 1, an image display apparatus 1 in this embodiment is provided with: a display device 10; a microlens array panel 22; a display control device 100; and a planar position detection device 110.

The display device 10, which is one example of the "displaying device" of the present invention, is provided with a screen for displaying a 2-dimensional (2D) image. The display device 10 is provided, for example, with a panel-type display apparatus, such as a liquid crystal apparatus; however, it may be provided with a display apparatus, such as a CRT.

The microlens array panel 22, which is one example of the "image transmitting panel" of the present invention, is provided, for example, with a plurality of microlenses 22a in a matrix shape on its both sides. The microlens array panel 22 is disposed on the optical path of display light which constitutes the 2D image displayed on the screen of the display device 10, and it transmits the display light of the display device 10 such that the real image of the 2D image is displayed on an imaging plane 30 located in a space opposite to the screen of the display device 10. In this manner, 3D image display or stereoscopic image display by e.g. a 3D floating vision method is performed. For example, as viewed from an observer who is in front of the screen of the display device 10 through the microlens array panel 22, the real image looks like floating on the imaging plane 30 on the front side, e.g. several to several tens centimeters, of the microlens array panel 22.

Incidentally, it is better to form an erected image by forming the microlens array panel 22 by bonding e.g. two microlens array panels, and by reversing each portion of the display light once on the first microlens array panel and reversing it again on the second microlens array panel. Moreover, depending on applications, if there is no problem even if the image formed on each microlens 22a is reversed, one microlens array panel may be used as the microlens array panel 22. Alternatively, in addition to or instead of this, if the pitch of the microlenses 22a is set smaller than the image pitch of the display device 10, even if the reverse is performed in each microlens 22a, the real image displayed on the imaging plane 30 as a whole is not reversed compared to the 2D image directly displayed on the screen of the display device 10. Therefore, the pitch of the microlenses 22a may be narrowed to prevent such a reverse phenomenon of the real image. However, the structure of the microlenses 22a is not limited to this.

The planar position detection device 110, which is one example of the "planar position detecting device" of the present invention, is adapted to detect a crossed planar area when an actual object 120 crosses the imaging plane 30 and to transmit the detection result to the display control device 100. The planar position detection device 110 is, for example, various noncontact touch sensors and a camera-type sensor.

The display control device 100, which is one example of the "display controlling device" of the present invention, is provided preferably with a logic operation circuit, such as a known central processing unit (CPU), a read only memory (ROM) in which a control program is stored, and a random access memory (RAM) in which various data is stored. The display control device 100 is adapted to control the display device 10 to perform a "masking process" detailed later on a timely basis. More specifically, when the planar position detection device 110 detects that the actual object 120 crosses the imaging plane 30, the display control device 100 controls the display device 10 to perform the masking process in which an image portion is made invisible from the observer looking at the image formed on the imaging plane 30, on the image portion of the 2D image of the display device 10 corresponding to at least the planar area detected to be occupied by the actual object 120 on the imaging plane 30. The display control device 100 is adapted to perform a process of changing the image portion to a background image or a black portion, selectively on the 2D image or the image data, or a process of displaying nothing, or the like, as the "masking process", as detailed below.

Next, the operations in this embodiment constructed in the above manner will be explained by using FIG. 2 to FIG. 6 in addition to FIG. 1. FIG. 2 is a flowchart showing the operations of the image display control apparatus in the first embodiment of the present invention. FIG. 3 are a series of schematic perspective views to explain crossing (or fusion) of an actual object and an imaging plane in the first embodiment of the present invention. FIG. 4 are a series of schematic cross sectional views to explain a masking process in the first embodiment of the present invention. FIG. 5 is a schematic conceptual view to explain the masking process in the first embodiment of the present invention. FIG. 6 is a schematic conceptual view to explain the situation that the trajectory of a cross area is stored to perform control in the first embodiment of the present invention.

In FIG. 2, firstly, the display control device 100 generates the 2D image (or original image) (step S001). The original image is displayed as shown in the step S001 in FIG. 5 or the step S001 in FIG. 6, as viewed from the observer who is in front of the display device 10.

Then, it is judged whether or not the actual object 120 crosses the imaging plane 30 (step S002).

Here, for example, as shown in FIG. 3(a) and its cross sectional view, FIG. 4(a), if the actual object 120 does not cross the imaging plane 30 (the step S002: No), the actual object 120 is located on the front side of the imaging plane 30. Thus, even if no countermeasures are taken, the 3D image display or stereoscopic image display does not appear odd. Thus, the process can be moved to a step S004 without the masking process.

On the other hand, if the actual object 120 crosses the imaging plane 30 (the step S002: Yes), if no countermeasures are taken, there may be a sense of discomfort as seen in FIG. 3(b) and its cross sectional view, FIG. 4(b). That is, if the tip portion of the actual object 120 is inserted to the imaging plane 30, the image plane 30 should be located on the front side of the tip portion of the actual object 120, as viewed from the observer. However, the imaging plane 30 is hidden in the tip portion of the actual object 120 and the observer cannot see it, so that the observer feels discomfort.

Thus, in this embodiment, in order to dispel the sense of discomfort, a cross area in which the actual object 120 crosses the imaging plane 30 is detected by the planar position detection device 110, such as a camera-type sensor (step S101).

Then, the display control device 100 generates a mask corresponding to the detection result, as a first masking process. For example, a mask in the same size as that of the planar area detected in the step S101 is generated, as shown in a step S102 in FIG. 5 (step S102). More preferably, a mask slightly larger than the planar area by a predetermined margin is generated as shown in the step S102 in FIG. 5. As described above, by more or less providing the margin, it is possible to respond to the case that there is some difference in the angle of sight between the both eyes of the observer and that the observer more or less observes at a position off the front, as well. Incidentally, if the actual object 120 is displaced, a real-time process may be performed such that the generated mask also follows the displacement. Alternatively, as shown in the step S102 in FIG. 6, when the actual object 120 is displaced at a predetermined time interval (time point t=0 to t=T), a set of the planar areas in which the actual object 120 crosses the imaging plane 30 may be stored as a trajectory, to thereby make a mask corresponding to the trajectory.

After that, the display control device 100 combines the original image obtained in the step S001, as a second masking process, and the mask obtained in the step S002 (step S103). The 2D image after the combining is, for example, in a shape shown in the step S103 in FIG. 5 or the step S103 in FIG. 6. That is, the combining process (or masking process) is performed as if the original image was bored in the mask portion. For example, in the step S103 in FIG. 5, the combining process is performed as if the heart-shaped original image was struck by the actual object 120. In the step S103 in FIG. 6, the combining process is performed as if the heart-shaped original image was divided by the actual object 120.

The 2D image obtained from the result of the masking process described above is displayed on the screen of the display device 10 (step S004). Then, the display light which constitutes the displayed 2D image is transmitted by the microlens array panel 22 disposed on the optical path of the display light, and it is displayed as the real image on the imaging plane 30 through the microlens array panel 22 (step S005).

As a result, it is possible to eliminate the sense of discomfort the observer feels, for example, as shown in FIG. 3(c) and its cross sectional view, FIG. 4(c). For example, by blackening the area which is the same as or slightly larger than the portion crossed by the actual object 120 of the imaging plane 30, it looks like there is a hole, in the eyes of the observer. Thus, seeing the tip portion of the actual object 120 located on the rear side of the hole does not feel strange.

As explained above with reference to FIG. 1 to FIG. 6, even if the actual object 120 enters between the imaging plane 30 and the microlens array panel 22 beyond the imaging plane 30, the masking process is performed as feedback. Thus, it is possible not to provide unnatural display caused by the actual object 120 superimposed on the formed image, without bringing discomfort on the 3D image display or stereoscopic image display. In particular, by providing the mask slightly larger by the predetermined margin, as shown in FIG. 5, it is possible to adapt to the difference in the angle of sight between the both eyes of the observer and the change in the observation position, extremely advantageously. Moreover by storing the set of the planar areas in which the actual object 120 crosses the imaging plane 30, as shown in FIG. 6, it is possible to express the fusion between the actual object and the 3D image display or stereoscopic image display, more richly.

Incidentally, in FIG. 6, after the actual object 120 crosses the imaging plane 30, the control may be performed to restore the heart-shaped original image without delay or to continue to be displayed as the broken image, depending on the applications. In addition, if the speed that the actual object 120 crosses the imaging plane 30 is rather slow, the display may be changed to display the hole, as shown in FIG. 6, in accordance with the sideways motion of the actual object 120.

Second Embodiment

The image display apparatus in this embodiment will be explained with reference to FIG. 7 to FIG. 9.

Firstly, the structure of the image display apparatus in this embodiment will be explained with reference to FIG. 7. FIG. 7 is a block diagram showing the image display control apparatus in the second embodiment of the present invention. Incidentally, in FIG. 7 in this embodiment, the same structure as in the first embodiment shown in FIG. 1 carries the same numerical reference, and the explanation thereof will be omitted, as occasion demands.

In FIG. 7, an image display apparatus 1 in this embodiment is provided with: a display device 10; a microlens array panel 22; a display control device 100; and a spatial position detection device 111.

The spatial position detection device 111, which is one example of the "spatial position detecting device" of the present invention, is adapted to detect a spatial area occupied by an actual object 120 in the space between an imaging plane 30 and the microlens array panel 22 and to transmit the detection result to the display control device 100. The spatial position detection device 111 may be various sensors, such as an XYZ sensor, a CCD image sensor disposed to capture the imaging plane 30 in the front, an infrared sensor, and an ultrasonic sensor. In addition, the spatial position detection device 111 may be replaced with a plurality of planar position detection devices 110 (refer to FIG. 1) arranged in piles at predetermined intervals and used in the first embodiment. Alternatively, the detection result from one planar position detection device 110 may be accumulated in the course of time into a memory built in or externally mounted on the display control device 100, to thereby detect the actual object 120 which passes through the imaging plane 30 as the set of the planar areas.

Incidentally, the detection of the planar position and the spatial position as described above may be static or dynamic, and can employ an aspect depending on the applications. That is, the detection may be performed from the position information and the shape of the actual object registered in advance in a memory, or the detection may be performed in real time by various sensors, such as an XYZ sensor.

In the second embodiment, as compared to the aforementioned first embodiment, it is different mainly in that the spatial position detection device 111 is provided and in that the display control device 100 is adapted to perform processes from the detection of the actual object 120 to the execution of the masking process, as detailed below. The other construction is the same as that of the first embodiment explained with reference to FIG. 1 to FIG. 6.

Next, the operations in this embodiment constructed in the above manner will be explained by using FIG. 8 and FIG. 9 in addition to FIG. 7. FIG. 8 is a flowchart showing the operations of the image display control apparatus in the second embodiment of the present invention. FIG. 9 are a series of schematic cross sectional views to explain a masking process based on an orthogonal projection image in the first embodiment of the present invention. Incidentally, in the flowchart in FIG. 7 in this embodiment, the same steps as those in FIG. 2 in the first embodiment carry the same step numbers, and the explanation thereof will be omitted, as occasion demands.

The different point in the processes of the second embodiment from those of the first embodiment is that a step S201 and a step S202 in FIG. 8 are performed instead of the step S101 and the step S102 in FIG. 2. The other processes are the same as in the case of FIG. 2.

That is, in FIG. 8, after the step S001 is performed as in the first embodiment, the step S002 is performed by the spatial position detection device 111. For example, if the actual object 120, such as a finger, crosses the imaging plane 30 (the step S002: Yes), the spatial position detection device 111 detects the spatial area occupied by the actual object 120 in the space between the imaging plane 30 and the microlens array panel 22 (step S201).

Then, the display control device 100 generates a mask corresponding to the detected spatial area, as a first masking process (step S202). The mask here preferably has the same shape as or a slightly larger shape than that of the planar area, which is obtained by orthogonally projecting the detected spatial area on the imaging plane 30. This is because the area orthogonally projected on the imaging plane 30 is considered to correspond to the image portion where the real image on the imaging plane 30 is blocked by the actual object 120, as viewed from the observer.

Here, with reference to FIG. 9, the unique action in this embodiment will be explained which is obtained by using the spatial position detection device 111 in the step S201 and the step S202 described above.

FIG. 9(a) and FIG. 9(c) are cross sectional views of the image display apparatus in which the masking process is performed correspondingly to the planar area detected by the planar position detection device 110 in the first embodiment. According to the cross sectional views, the masking process is performed only on the planar area in which the actual object 120 actually crosses the imaging process 30.

On the other hand, FIG. 9(b) and FIG. 9(d) are cross sectional views of the image display apparatus in which the masking process is performed correspondingly to the planar area in which the spatial area detected by the spatial position detection device 111 in this embodiment is orthogonally projected on the imaging plane 30, and this embodiment (second embodiment) is its representative. According to the cross sectional views, the masking process is performed in view of not only the planar area in which the actual object 120 actually crosses the imaging process 30 but also the spatial area occupied by the actual object 120 in the space between the imaging plane 30 and the microlens array panel 22.

As described above, this embodiment acts effectively even if the actual object 120 is inserted obliquely to the imaging plane 30 as shown in FIG. 9(a), and even if a first portion of the actual object 120 inserted to the display device 10 side is larger than the planar area (or wrist portion) in which the actual object 120 crosses the imaging plane 30. That is, as shown in FIG. 9(b) and FIG. 9(d), the mask corresponding to the orthogonal projection image on the imaging plane 30 in the portion of the actual object 120 inserted to the display device 10 side from the imaging plane 30 is generated, and the masking process is performed.

In FIG. 8 again, after the step S201 and the step S202 are performed as described above, the step S103, the step S104, and the step S105 are performed as in the first embodiment.

According to the embodiment shown in FIG. 7 to FIG. 9, even if the actual object 120 enters into the spatial area in which the imaging plane 30 is located, the masking process is performed as feedback. Thus, it is possible not to provide unnatural display caused by the actual object 120 superimposed on the formed image, without bringing discomfort on the 3D image display or stereoscopic image display. Therefore, even if the actual object 120 in a complicated shape is displaced to cross the imaging plane 30 in a direction other than a perpendicular direction to the imaging plane 30, it is possible to relatively reduce the sense of discomfort the observer feels.

Incidentally, it may be constructed such that both the planar position detection device 110 in the first embodiment and the spatial position detection device 110 in the second embodiment are provided and used as the occasion demands.

Third Embodiment

The image display apparatus in this embodiment will be explained with reference to FIG. 10 and FIG. 11.

Firstly, the structure of the image display apparatus in this embodiment will be explained with reference to FIG. 10. FIG. 10 is a block diagram showing the image display control apparatus in the third embodiment of the present invention. Incidentally, in FIG. 10 in this embodiment, the same structure as in the first embodiment shown in FIG. 1 carries the same numerical reference, and the explanation thereof will be omitted, as occasion demands.

In FIG. 10, an image display apparatus 1 in this embodiment is provided with: a display device 10; a microlens array panel 22; a display control device 100; and a driving apparatus 131.

The driving apparatus 131, which is one example of the "displacing device" of the present invention, is, for example, a motor-driving arm and is adapted to displace an actual object 120 in a direction of crossing at least an imaging plane 30. The displacement direction may be a normal direction of the imaging plane 30, and it may be a direction of crossing the imaging plane 30 obliquely. Moreover, the driving apparatus 131 is, for example, electrically connected to the display control device 100, and it is adapted to transmit position data Dp of the actual object 120 to the display control device 100.

In this embodiment, particularly, the driving apparatus 131 is adapted to transmit the position data Dp to the display control device 100 selectively only if the actual object 120 crosses the imaging plane 30. That is, as long as the position data Dp is not transmitted, the display control device 100 does not perform the masking process. The driving apparatus 131, however, can be also adapted to always transmit the position data Dp to the display control device 100 and always judge whether or not the actual object 120 crosses the imaging plane 30 on the display control device 100 side.

The display control device 100 controls the display device 10 to perform the masking process in conjunction with the displacement by the driving apparatus 131, on the basis of the position data Dp transmitted from the driving apparatus 131.

Incidentally, the position data Dp may be data which indicates the planar area portion occupied by the actual object 120 on the imaging plane 30. In this case, the display control device 100 only needs to perform the same masking process as in the first embodiment, in respond to that the actual object 120 crosses the imaging plane 30. Alternatively, the position data Dp may be data which indicates the spatial area portion occupied by the actual object 120 between the imaging plane 30 and the microlens array panel 22. In this case, the display control device 100 only needs to perform the same masking process as in the second embodiment, in respond to that the actual object 120 crosses the imaging plane 30.

In the third embodiment, as compared to the aforementioned first or second embodiment, it is different mainly in that not the position detection device but the driving apparatus 131 for outputting the position data Dp is provided and in that the display control device 100 is adapted to perform processes leading to the execution of the masking process based on the position data Dp, as detailed below. The other construction is the same as that of the first or second embodiment.

Next, the operations in this embodiment constructed in the above manner will be explained by using FIG. 11 in addition to FIG. 10. FIG. 11 is a flowchart showing the operations of the image display control apparatus in the third embodiment of the present invention. Incidentally, in the flowchart in FIG. 11 in this embodiment, the same steps as those in FIG. 2 in the first embodiment carry the same step numbers, and the explanation thereof will be omitted, as occasion demands.

That is, in FIG. 11, after the step S001 is performed as in the first embodiment, the driving apparatus 131 transmits the position information Dp of the actual object 120 to the display control device 100 in such an operation that the actual object 120, such as a mechanical part for amusement application, is displaced by the driving apparatus 131. In this embodiment, the driving apparatus 131 transmits the position data Dp to the display control device 100 selectively only if the actual object 120 crosses the imaging plane 30. Thus, the display control device 100 monitors whether or not the position data Dp is transmitted (step S302). If the position data Dp is not transmitted (the step S302: No), the display control device 100 does not perform the masking process, and the operational flow moves to the process of the step S004.

On the other hand, if the position data Dp is transmitted (the step S302: Yes), the display control device 100 controls the display device 10 to perform the masking process as feedforward control, on the basis of the position data Dp transmitted from the driving apparatus 131 (step S303). That is, the same masking process as in the step S102 and the step S103 (refer to FIG. 2) in the first embodiment is performed, or the same masking process as in the step S202 and the step S103 (refer to FIG. 8) in the second embodiment is performed.

After that, as in the first or second embodiment, the step S004 and the step S005 are performed.

According to the embodiment shown in FIG. 10 and FIG. 11, by performing the masking process as feed-forward, even if the actual object 120 crosses the imaging plane 30 in accordance with the predetermined motion of a mechanical part or the like, it is possible to prevent unnatural display to inhibit the influence of the crossing in advance as much as possible.

Fourth Embodiment

The image display apparatus in this embodiment will be explained with reference to FIG. 12 and FIG. 13.

Firstly, the structure of the image display apparatus in this embodiment will be explained with reference to FIG. 12. FIG. 12 is a block diagram showing the image display control apparatus in the fourth embodiment of the present invention. Incidentally, in FIG. 12 in this embodiment, the same structure as in the first embodiment shown in FIG. 1 carries the same numerical reference, and the explanation thereof will be omitted, as occasion demands.

In FIG. 10, an image display apparatus 1 in this embodiment is provided with: a display device 10; a microlens array panel 22; a display control/lighting control device 100*d*; a position detection device 112; a shading apparatus 200; and a lighting apparatus 201.

In this embodiment, particularly, the shading apparatus 200, the lighting apparatus 201, and the display control/lighting control device 100*d* function as one example of the "masking process device" of the present invention.

The shading apparatus 200 is formed of a shading member in a box or film shape, for example. The shading apparatus 200 is located to cover the rear side of the imaging plane 30 as viewed from the observer, and is adapted to shade light irradiated in the actual object 120 portion (e.g. a finger tip) located on the rear side of the imaging plane 30.

The lighting apparatus 201 may be, for example, a fluorescent and a halogen lamp, and preferably LED (Light Emitting Diode) light which is highly directional. The lighting apparatus is adapted to irradiate high-intensity light selectively onto the actual object 120 portion (e.g. back of the hand and the arm) located on the front side of the imaging plane 30 as viewed from the observer.

The display control/lighting control device 100*d* is adapted not only to control the display device 10 to display the 2D image control, functioning as the display control device, but also to control at least the lighting operation of the lighting apparatus 201 to perform the masking process by using the shading apparatus 200 and the lighting apparatus 201 detailed later when the position detection device 112 detects that the actual object 120 enters into the rear side of the imaging plane 30. Alternatively, the display control/lighting control device 100*d* is adapted to control both the shading apparatus 200 and the lighting apparatus 201. In the latter case, the display control/lighting control device 100*d* may be also referred to as a "display control/shading and lighting control device".

In this embodiment, the lighting apparatus 201 is adapted to be lighted or increase brightness selectively when the "masking process" is performed, under the control of the display control/the lighting control device 100*d*.

On the other hand, the shading apparatus 200 is formed of a shading member or the like, such as a shading film, and it may always perform the shading; however, it may perform the shading or increase a shading effect selectively when the "masking process" is performed. In this case, it is possible to apply the existing various technologies as the shading apparatus 200 for selectively performing the shading, such as reducing transmittance in accordance with a voltage application to thereby perform the shading or mechanically closing a shutter. Moreover, in a period when the shading is not performed, there may be provided the lighting apparatus for irradiating light to the space between the imaging plane 30 and the microlens array panel 22, on the inner side. In any case, if the shading is performed selectively, the shading is performed or the shading performance is increased in conjunction with that the lighting apparatus 201 performs the lighting or increases the brightness, under the control of the display control/lighting control device 100*d*.

Moreover, the position detection device 112 is provided with at least one of the planar position detection device 110 and the spatial position detection device 111 described above. In this embodiment, however, the position detection device 112 only needs to detect whether or not the actual object 120 crosses the planar area.

In the fourth embodiment, as compared to the aforementioned first or second embodiment, it is different mainly in that the shading apparatus 200 and the lighting apparatus 201 are provided and in that the display control/lighting control device 100*d* is adapted to perform processes leading to the execution of the masking process in accordance with the detection result by the position detection device 112, as detailed below. The other construction is the same as that of the first or second embodiment.

Next, the operations in this embodiment constructed in the above manner will be explained by using FIG. 13 in addition to FIG. 12. FIG. 13 is a flowchart showing the operations using the shading apparatus 200 and the lighting apparatus 201, in the fourth embodiment. Incidentally, in the flowchart in FIG. 13 in this embodiment, the same steps as those in FIG. 2 in the first embodiment carry the same step numbers, and the explanation thereof will be omitted, as occasion demands.

That is, in FIG. 13, after the step S001 is performed as in the first embodiment, it is judged by the position detection device 112 whether or not the actual object 120, such as a finger, crosses or is displaced to cross the imaging plane 30 (step S401).

Here, if the actual object 120 does not cross and is not displaced to cross the imaging plane 30 (the step S401: No), it is unnecessary to perform the masking process. Thus, the operational flow goes to the process of the step S004.

On the other hand, if the actual object 120 crosses or is displaced to cross the imaging plane 30 (the step S401: Yes), the display control/lighting control device 100d performs the optical masking process on the actual object 120. That is, the display control/lighting control device 100d performs such a masking process that the actual object 120 portion is made invisible from the observer, on the actual object 120 portion (e.g. a finger tip) which is on the rear side of the imaging plane 30 or on the actual object 120 portion which is approaching, as viewed from the observer looking at the actual object 120 (step S402). Specifically, under the control of the display control/lighting control device 100d, the lighting apparatus 201 irradiates the front side of the imaging plane 30. During this time, the shading apparatus 200 shades the rear side of the imaging plane 30. Alternatively, in addition to this, under the control of the display control/lighting control device 100d, the shading apparatus 200 shades the rear side of the imaging plane 30, and the lighting apparatus 201 irradiates the front side of the imaging plane 30.

After that, as in the first or second embodiment, the step S004 and the step S005 are performed.

According to the embodiment shown in FIG. 12 and FIG. 13, when the actual object 120 crosses the imaging plane 30, a contrast ratio between the front and the rear of the imaging plane 30 relatively increases, quickly. Moreover, the actual object 120 portion (e.g. a finger tip) on the rear side of the imaging plane 30 is not seen from the observer because it is dark or it does not really exist. Moreover, in addition to the cooperation of both the shading apparatus 200 and the lighting apparatus 201, in fact, a situation in which the actual object 120 portion on the rear side of the imaging plane 30 is hardly seen from the observer is actually created because of the reaction of the iris of a human. Therefore, in the 3D image display or stereoscopic image display, even if the actual object 120, such as a finger and an object, is superimposed on the imaging plane 30, it is possible to provide natural display without bringing discomfort on the 3D image display or stereoscopic image display.

In this embodiment, of the shading by the shading apparatus 200 and the lighting by the lighting apparatus 201, at least the latter is actively controlled; however, as a modified example of this embodiment, the lighting apparatus 201 may be always lighted and the shading by the shading apparatus 200 may be always performed. By virtue of such construction, without the control of the complicated masking process, it is possible to make it hard for the observer to see the actual object 120 which is closer to the microlens array panel 22 than the imaging plane 30, to some extent. That is, the simplified masking process can be performed. Moreover, as the simplified method, the lighting by the lighting apparatus 201 may be stopped, and the masking process may be performed only by the shading by the shading apparatus 201. By virtue of such construction, without the control of the complicated masking process, it is possible to make it hard for the observer to see the actual object 120 which is closer to the microlens array panel 22 than the imaging plane 30, in any way. That is, the inexpensive and simplified masking process can be performed. Incidentally, in the modified examples, the shading apparatus 200 functions as one example of the "shading device" of the present invention.

However, it is obvious that as compared to the modified examples, the embodiment which more positively uses the reaction characteristic of the iris of a human, allows the masking process more certainly.

Fifth Embodiment

The image display apparatus in this embodiment will be explained with reference to FIG. 14 and FIG. 15.

Firstly, the structure of the image display apparatus in this embodiment will be explained with reference to FIG. 14. FIG. 14 is a block diagram showing the image display control apparatus in the fifth embodiment of the present invention. Incidentally, in FIG. 14 in this embodiment, the same structure as in the first embodiment shown in FIG. 1 or the fourth embodiment shown in FIG. 12 carries the same numerical reference, and the explanation thereof will be omitted, as occasion demands.

In FIG. 14, an image display apparatus 1 in this embodiment is provided with: a display device 10; a microlens array panel 22; a display control/drive control device 100e; a position detection device 112; and an actual object 120e.

In particular, the actual object 120e is, for example, a mechanical part for amusement application, and it includes a slide device 121 and a driving apparatus 121e for driving the slide device 121.

The slide device 121, the driving apparatus 121e, and the display control/drive control device 100e function as one example of the "masking process device" of the present invention. The slide device 121 normally projects outward from the actual object 120e, as one portion of the actual object 120e. However, under a predetermined condition, such as the case that the actual object 120e is displaced to cross the imaging plane 30, for example, the slide device 121 is adapted to slide in a direction relatively away from the imaging plane 30 and to hide inside of the actual object 120e by receiving a control signal from the display control/drive control device 100e which can electromagnetically communicate and by being driven by the driving apparatus 121e. Incidentally, the display control/drive control device 100e can also perform the control, as the display control device for controlling the display device 10 to display the 2D image, as in the first embodiment.

Incidentally, as one portion of the "masking process device" of the present invention, it is not limited to the aforementioned sliding method if the modification can be performed such that the actual object 120e displaced to the rear side of the imaging plane 30 does not exist partially. That is, the masking process may be performed on the actual object 120e, for example, by an operation of mechanical cutting, chemical sublimation, or the like.

Next, the operations in this embodiment constructed in the above manner will be explained by using FIG. 15 in addition to FIG. 14. FIG. 15 is a flowchart showing the operations of the image display control apparatus in the fifth embodiment of the present invention. Incidentally, in the flowchart in FIG. 15 in this embodiment, the same steps as those in FIG. 2 in the first embodiment carry the same step numbers, and the explanation thereof will be omitted, as occasion demands.

That is, in FIG. 15, after the step S001 is performed as in the first embodiment, the step S401 is performed as in the fourth embodiment. If the actual object 120 crosses or is displaced to cross the imaging plane 30 (the step S401: Yes), a driving signal is issued to the driving apparatus 121e by the display control/drive control device 100e, and the slide device 121 is slid by the driving apparatus 121e. That is, the mechanical masking process is performed. By this, the modification is performed on the stereo shape of the actual object 120e such that the slide portion 121 corresponding to the portion of the actual object 120e displaced closer than the imaging plane 30 does not physically exist (step S501). As described above, the slide device 121 is slid and pulled inside of the actual object 120e, so that the slide device 121 is not seen from the observer looking at the imaging plane 30.

After that, as in the first or fourth embodiment, the step S004 and the step S005 are performed.

According to the embodiment shown in FIG. 14 and FIG. 15, by performing the masking process of pulling the slide device 121, which is a portion of the actual object 120e displaced to the rear side of the imaging plane 30, the actual image formation is not interrupted and the 3D image display or stereoscopic image display is not damaged.

Sixth Embodiment

The image display apparatus in this embodiment will be explained with reference to FIG. 16.

The hardware structure of the image display apparatus in this embodiment is the same as that in the aforementioned second embodiment (refer to FIG. 7). This embodiment is an embodiment about a software process in which it is judged whether or not to be in an "abnormal state" and if it is judged to be in the abnormal state, the stereoscopic image display is stopped to announce the abnormal state or to avoid the abnormal state, wherein in the abnormal state it is no longer possible to display the stereoscopic image in combination with the actual object 120 by adjusting the image in the hardware structure of the second embodiment. FIG. 16 is a flowchart to explain the process associated with the response to the abnormality. Incidentally, in the flowchart in FIG. 16 in this embodiment, the same steps as those in FIG. 8 in the second embodiment carry the same step numbers, and the explanation thereof will be omitted, as occasion demands.

The operations in this embodiment will be explained by using FIG. 16 in addition to FIG. 7.

That is, in FIG. 16, after the step S001 to the step S201 are performed as in the second embodiment, it is judged whether or not there is an abnormality, by the display control device 100 (step S601). Specifically, it is judged whether or not the spatial area occupied by the actual object 120 exceeds a threshold value related to a volume or a range set in advance. For example, if the actual object 120 is displaced to the rear of the imaging plane 30 so much that it comes in contact with the surface of the microlens array panel 22, or if the actual object 120 is extremely larger than the formed image and thus the 3D image display or stereoscopic image display by the image formation no longer has a practical meaning, the threshold value set in advance is exceeded, and it is judged that there is the abnormality.

Here, if it is judged that there is no abnormality (the step S601: No), the step S202 to the step S005 are performed as in the second embodiment.

On the other hand, if it is judged that there is the abnormality (the step S601: Yes), a predetermined type of abnormality responding process is performed (step S602). For example, the abnormality responding process, such as making a warning sound and displaying a warning message on the display device 10, may be performed, and a series of processes in this embodiment may be forcibly ended.

According to the embodiment shown in FIG. 16, for example, while properly avoiding the abnormal situation which may cause an apparatus damage, it is possible to provide natural display without bringing discomfort on the 3D image display or stereoscopic image display.

Incidentally, in this embodiment, the abnormality judgment is performed on the basis of the detection result of the spatial position detection in the second embodiment; however, as the modified example thereof, the abnormal judgment may be performed on the basis of the detection result of the planar position detection in the embodiments other than the second embodiment. For example, as the result of the planar detection in the first embodiment, it may be judged to be abnormal if the area occupied by the actual object 120 in the planar area in which the imaging plane 30 is located exceeds a threshold value related to an area or a range set in advance. Alternatively, it may be judged to be abnormal by detecting that the actual object 120 comes in contact with or is about to contact the microlens array panel 22, with a contact detecting sensor or the like.

Seventh Embodiment

The image display apparatus in this embodiment will be explained with reference to FIG. 17 and FIG. 18.

Firstly, the structure of the image display apparatus in this embodiment will be explained with reference to FIG. 17. FIG. 17 is a block diagram showing the image display control apparatus in the seventh embodiment of the present invention. Incidentally, in FIG. 17 in this embodiment, the same structure as in the second embodiment shown in FIG. 7 carries the same numerical reference, and the explanation thereof will be omitted, as occasion demands.

In FIG. 174, an image display apparatus 1 in this embodiment is provided with: a display device 10; an IP-system microlens array panel 23; a display control device 100; and a spatial position detection device 111.

In particular, the IP-system microlens array panel 23, which is one example of the "3D image displaying device" of the present invention, includes a plurality of small convex lenses (microlenses) arranged in an array shape. Then, the IP-system microlens array panel 23 is disposed on the optical path of display light which constitutes a 2D image displayed on the screen of the display device 10, and it transmits the display light of the display device 10 such that the real image of the 2D image is displayed in a space opposite to the screen of the display device 10 in order to form a 3D image 31 with a depth in a direction of the display device 10. In this manner, 3D image display or stereoscopic image display by the IP system is performed, and for example, the 3D image 31, such as a sculpture with a depth, looks like floating.

The spatial position detection device 111, which is one example of the "spatial position detecting device" of the present invention, is adapted to detect a spatial area occupied by an actual object 120 in the space occupied by the 3D image 31 and to transmit the detection result to the display control device 100.

In the seventh embodiment, as compared to the aforementioned second embodiment, it is different mainly in that the IP-system microlens array panel 23 is provided instead of the microlens array panel 22 and in that the display control device 100 is adapted to perform processes from the detection of the actual object 120 to the execution of the masking process as detailed below.

Next, the operations in this embodiment constructed in the above manner will be explained by using FIG. 18 in addition to FIG. 17. FIG. 18 is a flowchart to explained the masking process if the IP-system is used for the 3D image display, in this embodiment. Incidentally, in the flowchart in FIG. 18 in this embodiment, the same steps as those in FIG. 8 in the second embodiment carry the same step numbers, and the explanation thereof will be omitted, as occasion demands.

The different point in the processes of the seventh embodiment from those of the second embodiment is that a step S701, a step S702, a step S703, and a step S704 in FIG. 18 are performed instead of the step S002, the step S201, the step S202, and the step S005 in FIG. 8.

That is, in FIG. 18, after the step S001 is performed as in the second embodiment, it is judged by the spatial position detection device 111 whether or not the actual object 120, such as a finger, crosses the 3D image 31 (step S701).

Here, if the actual object 120, such as a finger, does not cross the 3D image 31 (the step S701: No), the process of the step S004 and the subsequent process are performed without the masking process in this embodiment.

On the other hand, if the actual object 120 crosses the 3D image 31 (the step S701: Yes), the spatial position detection device 111 detects the spatial area occupied by the actual object 120 in the space occupied by the 3D image 31 (step S702).

Then, the display control device 100 generates a mask corresponding to the detected spatial area, as a first masking process (step S703). The mask herein is preferably in the same shape as or a slightly larger shape than that of an area in which the detected spatial area is orthogonally projected on the surface of the 3D image 31 (or a planar surface or a curved surface in which the actual object 120 crosses the 3D image 31). That is, the area orthogonally projected on the 3D image is considered to correspond to a portion of the 3D image 31 blocked by the actual object 120, as viewed from the observer. Incidentally, the mask may be not generated, depending on the positional relationship between the observer and the planar surface or the curved surface in which the actual object 120 crosses the 3D image 31. For example, it may be the case that the actual object 120 is displaced to cross the 3D image in a perpendicular direction to the 3D image 31. At this time, as viewed from the observer who is in front of the 3D image 31, the actual object 120 does not particularly unnaturally exist in the observation.

After that, in the step S103 and the step S004 as in the second embodiment, the 2D image on which the masking process is performed is displayed on the screen of the display device 10, and the display light which constitutes the 2D image is transmitted by the IP-system microlens array panel 23, to thereby form the 3D image 31 on which the masking process is performed (step S704).

As a result, even if the actual object 120 is displaced to cross the 3D image 31, it is possible to relatively reduce the sense of discomfort the observer feels.

Incidentally, it may be constructed such that both the planar position detection device 110 in the first embodiment and the spatial position detection device 110 in the second embodiment are provided and used as the occasion demands. Moreover, instead of the masking process as feedback, the masking process as feed-forward may be performed as in the third embodiment. Alternatively, instead of the masking process with the mask, the optical masking process as in the fourth embodiment or the mechanical masking process as in the fifth embodiment may be performed. Moreover, the same abnormality responding process as in the six embodiment may be performed.

As explained above in detail, according to the image display apparatus in the various embodiments, it is provided with the display device 10, the microlens array panel 22, the display control device 10 and the like. Thus, in the 3D image display or stereoscopic image display, even if the actual object crosses the real image surface, it is possible to continue the display without the sense of discomfort.

The present invention is not limited to the aforementioned embodiments, and various changes may be made without departing from the essence or spirit of the invention which can be read from the claims and the entire specification. An image display apparatus, which involves such changes, is also intended to be within the technical scope of the present invention. For example, in the aforementioned embodiments, as a matter of convenience, the imaging plane is treated as a planar surface; however, the "planar surface" in the present invention is not limited to the literal planar surface. That is, it includes the case that the imaging plane is a curved surface. At his time, in response to that the imaging plane is a curved surface, a portion in which the literal "planar surface" is to be read as the "curved surface" (e.g. the "planar area occupied by the actual object in the one planar surface" in the present invention) shall be interpreted after the change in reading, as occasion demands.

INDUSTRIAL APPLICABILITY

The image display apparatus according to the present invention can be applied to an image display apparatus, such as a 3D (Dimension) image display apparatus and a stereoscopic image display apparatus.

The invention claimed is:

1. An image display apparatus comprising:
    a displaying device for displaying a two-dimensional image on a screen;
    an image transmitting panel which is located on an optical path of display light which constitutes the two-dimensional image and which transmits the display light such that a formed image of the two-dimensional image is displayed on one planar surface located in a space opposite to the screen; and
    a display controlling device for controlling said displaying device to perform a masking process in which an image portion is made invisible from an observer looking at the formed image, on the image portion of the two-dimensional image corresponding to at least a planar area occupied by an actual object in the one planar surface, when the actual object located in the space opposite to the screen, with the one planar surface as a boundary, crosses the one planar surface,
    wherein said display controlling device controls said displaying device to perform the masking process on the image portion corresponding to an area which is slightly larger than the planar area by a predetermined margin, when the actual object crosses the one planar surface.

2. The image display apparatus according to claim 1, further comprising a planar position detecting device for detecting the planar area when the actual object crosses the one planar surface, said display controlling device controlling said displaying device to perform the masking process on the image portion corresponding to the detected planar area.

3. The image display apparatus according to claim 1, further comprising a spatial position detecting device for detecting a spatial area occupied by the actual object in a space between the one planar surface and said image transmitting panel, in addition to the planar area, when the actual object crosses the one planar surface, said display controlling device controlling said displaying device to perform the masking process on the image portion corresponding to the detected spatial area.

4. The image display apparatus according to claim 3, wherein said display controlling device controls said displaying device to perform the masking process on the image portion corresponding to a planar area in which the spatial area is orthogonally projected on the one planar surface, as the image portion corresponding to the detected spatial area.

5. The image display apparatus according to claim 1, further comprising a displacing device for displacing the actual object in a direction of crossing the one planar surface, said display controlling device controlling said displaying device to perform the masking process in conjunction with the displacement by said displacing device.

6. The image display apparatus according to claim 5, when the actual object is displaced, in performing the making process, a set of the planar areas in which the actual object crosses the imaging plane as a trajectory is stored for making the mask corresponding to the trajectory and expressing a fusion between the actual object and the image displayed.

7. The image display apparatus according to claim 1, wherein said image transmitting panel comprises a microlens array.

8. The image display apparatus according to claim 1, wherein said display controlling device controls said displaying device to selectively perform the masking process on the image portion corresponding to an area which is slightly larger than the planar area by a predetermined margin, when the actual object crosses the one planar surface, by i) in the display masking process, the display controlling device generates a mask corresponding to a detection result, the mask slightly larger than the planar area by the predetermined margin.

9. The image display apparatus according to claim 8, wherein the predetermined margin responding to a case that there is some difference in an angle of sight between both eyes of the observer in different observation positions.

10. The image display apparatus according to claim 8, when the actual object is displaced, said display controlling device performs a real-time process so that the generated mask also follows the displacement.

* * * * *